United States Patent
Smith et al.

(10) Patent No.: US 11,531,438 B2
(45) Date of Patent: Dec. 20, 2022

(54) DIFFERENTIAL DRIVE AND SENSE FOR TOUCH SENSOR PANEL

(71) Applicant: Apple Inc., Cupertino, CA (US)

(72) Inventors: John Stephen Smith, San Jose, CA (US); Amit Nayyar, Saratoga, CA (US); Joseph Kurth Reynolds, San Jose, CA (US); Sagar Rajiv Vaze, San Jose, CA (US); Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/326,249

(22) Filed: May 20, 2021

(65) Prior Publication Data

US 2021/0373711 A1 Dec. 2, 2021

Related U.S. Application Data

(60) Provisional application No. 63/032,523, filed on May 29, 2020.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05); *G06F 3/041662* (2019.05)

(58) Field of Classification Search
CPC .. G06F 3/0446; G06F 3/0412; G06F 3/04164; G06F 3/041662
See application file for complete search history.

(56) References Cited

U.S. PATENT DOCUMENTS

| | | | |
|---|---|---|---|
| 8,654,083 B2 | 2/2014 | Hotelling et al. | |
| 8,880,204 B2 | 11/2014 | Frei et al. | |
| 9,671,886 B2 | 6/2017 | Yoo et al. | |
| 10,101,838 B2 | 10/2018 | Zhang et al. | |
| 10,114,504 B2 | 10/2018 | Yan et al. | |
| 10,739,904 B2 | 8/2020 | Blondin et al. | |
| 10,845,930 B2 | 11/2020 | Krah et al. | |
| 2009/0184937 A1* | 7/2009 | Grivna | G06F 3/0446 345/173 |
| 2015/0054803 A1 | 2/2015 | Yashiro et al. | |

(Continued)

FOREIGN PATENT DOCUMENTS

WO 2015/030404 A1 3/2015

*Primary Examiner* — Md Saiful A Siddiqui
(74) *Attorney, Agent, or Firm* — Kubota & Basol LLP

(57) ABSTRACT

Touch sensor panels (or touch screens) can improve signal-to-noise ratio (SNR) using touch electrode patterns for differential drive and/or differential sense techniques. In some examples, a touch sensor panel can include a two-dimensional array of touch nodes formed from a plurality of touch electrodes. Each column (or row) of touch nodes can be driven with a plurality of drive signals. For example, a first column (or row) of touch nodes can be driven by a first drive signal applied to one or more first touch nodes in the first column (or row) and a second drive signal applied to a one or more second touch nodes of the first column (or row). In some examples, the first drive signal and the second drive signal can be complimentary drive signals. In some examples, each row (or column) of touch electrodes can be sensed by differential sense circuitry.

26 Claims, 13 Drawing Sheets

(56) References Cited

U.S. PATENT DOCUMENTS

| | | | |
|---|---|---|---|
| 2016/0342265 A1* | 11/2016 | Geaghan | G06F 3/0446 |
| 2017/0285806 A1* | 10/2017 | Xie | G06F 3/0445 |
| 2018/0217696 A1* | 8/2018 | Binstead | G06F 3/0446 |
| 2018/0224967 A1* | 8/2018 | Church | G06F 3/0445 |
| 2020/0257390 A1 | 8/2020 | David et al. | |
| 2020/0326828 A1* | 10/2020 | Otagaki | G06F 3/0446 |

* cited by examiner

DIFFERENTIAL DRIVE AND SENSE FOR TOUCH SENSOR PANEL

CROSS-REFERENCE TO RELATED APPLICATIONS

This application claims the benefit of U.S. Provisional Application No. 63/032,523, filed May 29, 2020, the contents of which is hereby incorporated by reference in its entirety for all purposes.

FIELD OF THE DISCLOSURE

This relates generally to touch sensor panels/screens, and more particularly to touch sensor panels/screens with differential drive and sense.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

BRIEF SUMMARY OF THE DISCLOSURE

This relates to touch sensor panels (or touch screens or touch-sensitive surfaces) with improved signal-to-noise ratio (SNR). In some examples, a touch sensor panel can include a two-dimensional array of touch nodes (e.g., arranged in rows and columns) formed from a plurality of touch electrodes. Each column (or row) of touch nodes can be driven with a plurality of drive signals. For example, a first column (or row) of touch nodes can be driven (at least partially concurrently) by a first drive signal applied to one or more first touch nodes in the first column (or row) and a second drive signal applied to a one or more second touch nodes of the first column (or row). In some examples, the first drive signal and the second drive signal can be complimentary drive signals (e.g., 180 degrees out of phase with each other). In some examples, a second column (or row) of touch nodes can be driven (at least partially concurrently) by a third drive signal applied to one or more first touch nodes in the second column (or row) and a fourth drive signal applied to a one or more second touch nodes of the second column (or row). In some examples, the second drive signal and the third drive signal can be complimentary drive signals (e.g., 180 degrees out of phase with each other). The second and third drive signals can be applied to adjacent column (or row) electrodes. Each row (or column) of sense (receiver) touch electrodes can be sensed by sense circuitry (e.g., differentially). In some examples, the receiver electrodes can be interleaved with driven touch nodes in the columns (or rows). The electrostatic fringe field coupling of the driven touch nodes can substantially alternate high and low with successive receiver electrodes in a repeating pattern. Differential driving (e.g., using complementary drive signals) and/or differential sensing can reduce noise in the touch and/or display systems of the touch screen.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch sensor panels (or touch screens) with improved signal-to-noise ratio (SNR). In some examples, a touch sensor panel can include a two-dimensional array of touch nodes (e.g., arranged in rows and columns) formed from a plurality of touch electrodes. Each column (or row) of touch nodes can be driven with a plurality of drive signals. For example, a first column (or row) of touch nodes can be driven (at least partially concurrently) by a first drive signal applied to one or more first touch nodes in the first column (or row) and a second drive signal applied to a one or more second touch nodes of the first column (or row). In some examples, the first drive signal and the second drive signal can be complimentary drive signals (e.g., 180 degrees out of phase with each other). In some examples, a second column (or row) of touch nodes can be driven (at least partially concurrently) by a third drive signal applied to one or more first touch nodes in the second column (or row) and a fourth drive signal applied to a one or more second touch nodes of the second column (or row). In some examples, the second drive signal and the third drive signal can be complimentary drive signals (e.g., 180 degrees out of phase with each other). The second and third drive signals can be applied to adjacent column (or row) electrodes. Each row (or column) of touch electrodes can be sensed by sense circuitry (e.g., differentially). Differential driving (e.g., using complementary drive signals) and/or differential sensing can reduce noise in the touch and/or display systems of the touch screen.

Figure 1A:
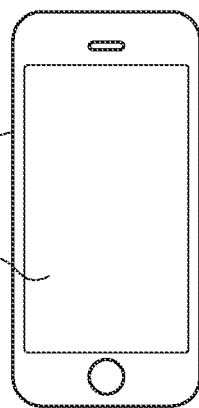
FIGS. 1A-1E illustrate example systems that can include a touch screen according to examples of the disclosure.
Figure 1B:
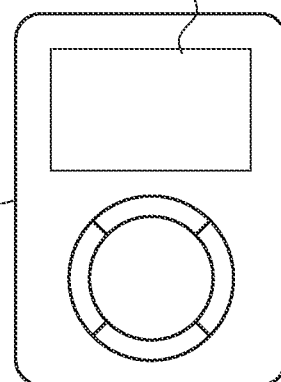
Figure 1C:
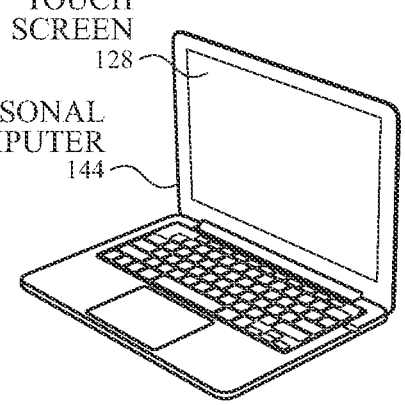
Figure 1D:
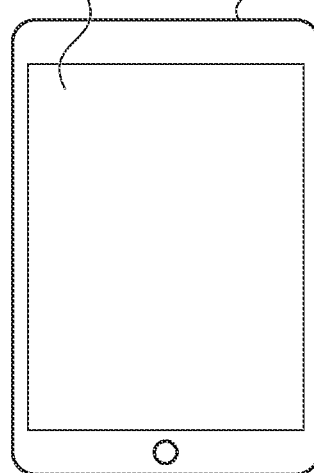
Figure 1E:
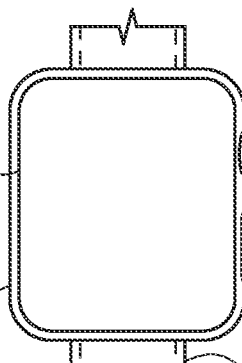

FIGS. 1A-1E illustrate example systems that can include a touch screen according to examples of the disclosure. FIG. 1A illustrates an example mobile telephone 136 that includes a touch screen 124 according to examples of the disclosure. FIG. 1B illustrates an example digital media player 140 that includes a touch screen 126 according to examples of the disclosure. FIG. 1C illustrates an example personal computer 144 that includes a touch screen 128 according to examples of the disclosure. FIG. 1D illustrates an example tablet computing device 148 that includes a touch screen 130 according to examples of the disclosure. FIG. 1E illustrates an example wearable device 150 that includes a touch screen 132 and can be attached to a user using a strap 152 according to examples of the disclosure. It is understood that a touch screen can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
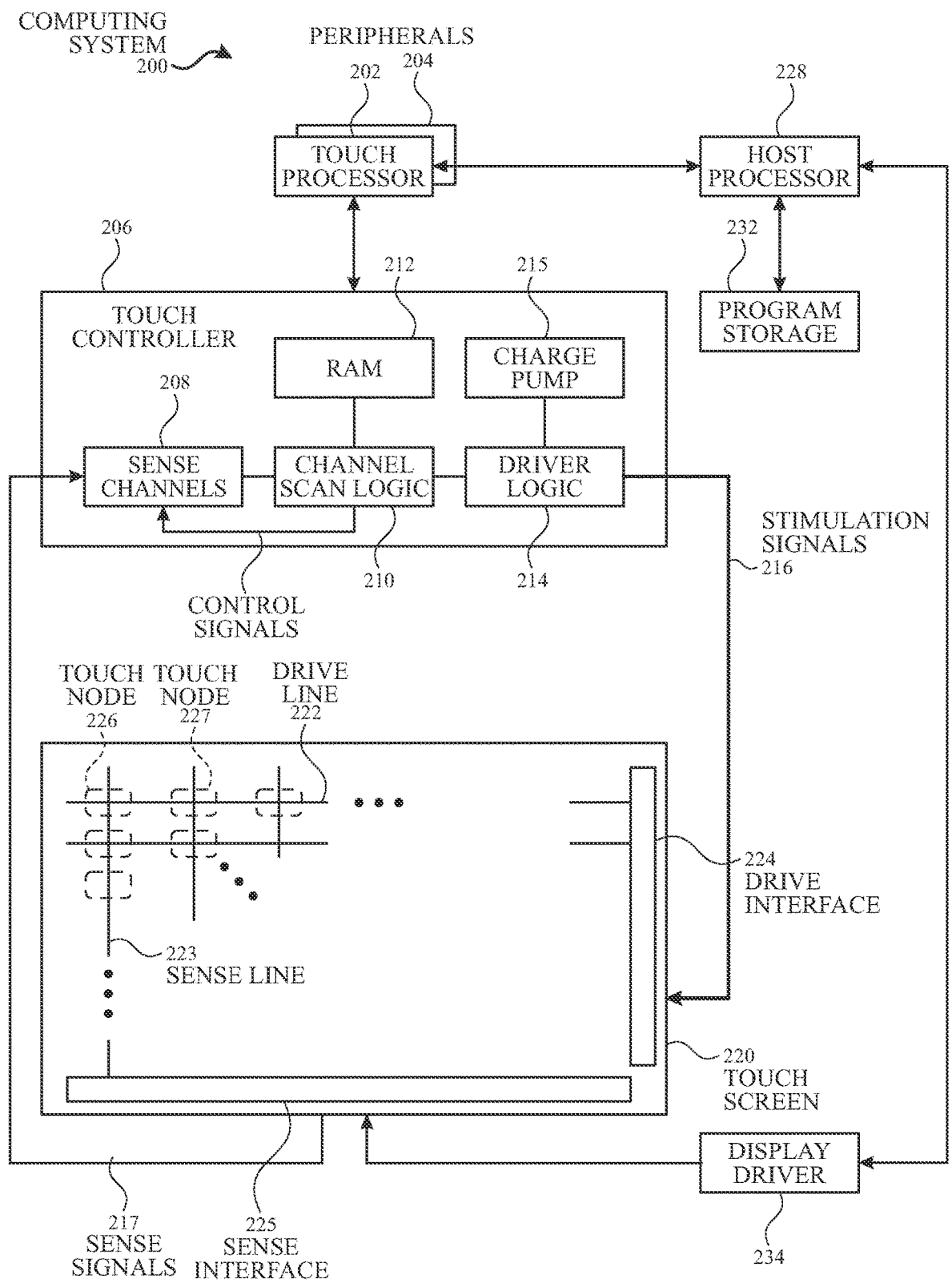
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
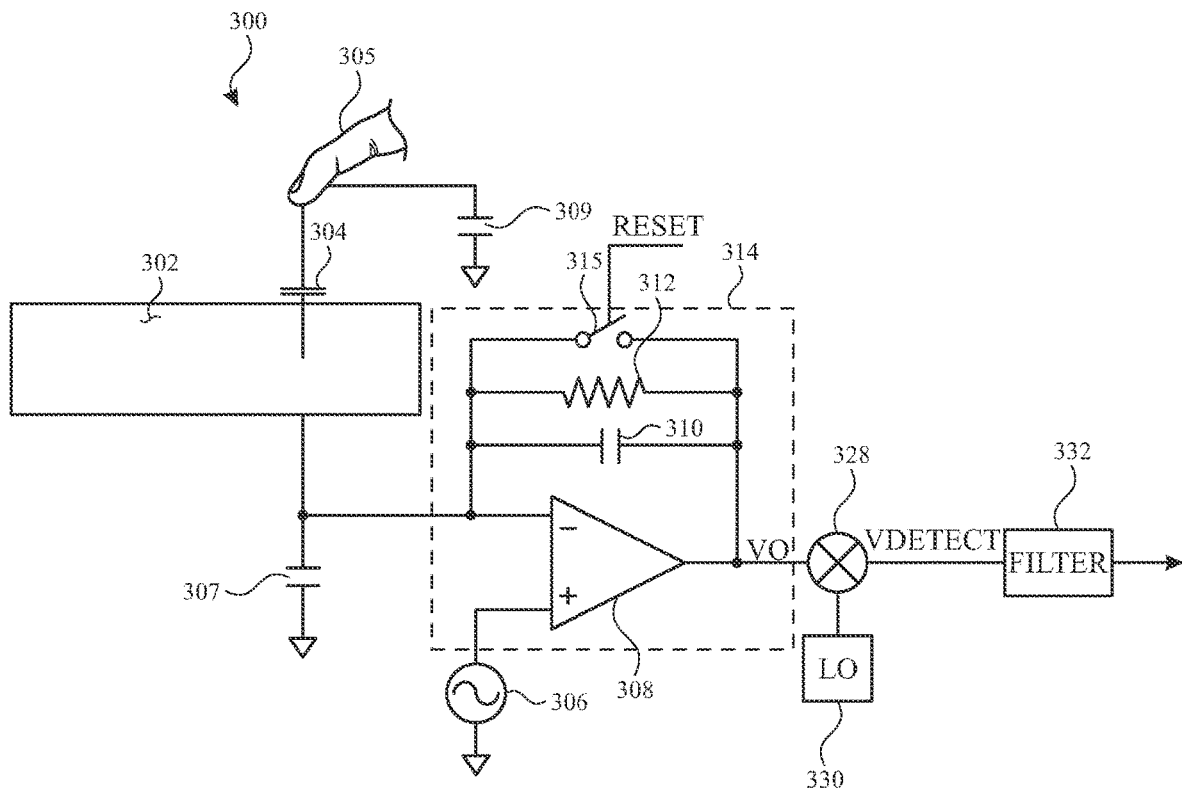
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
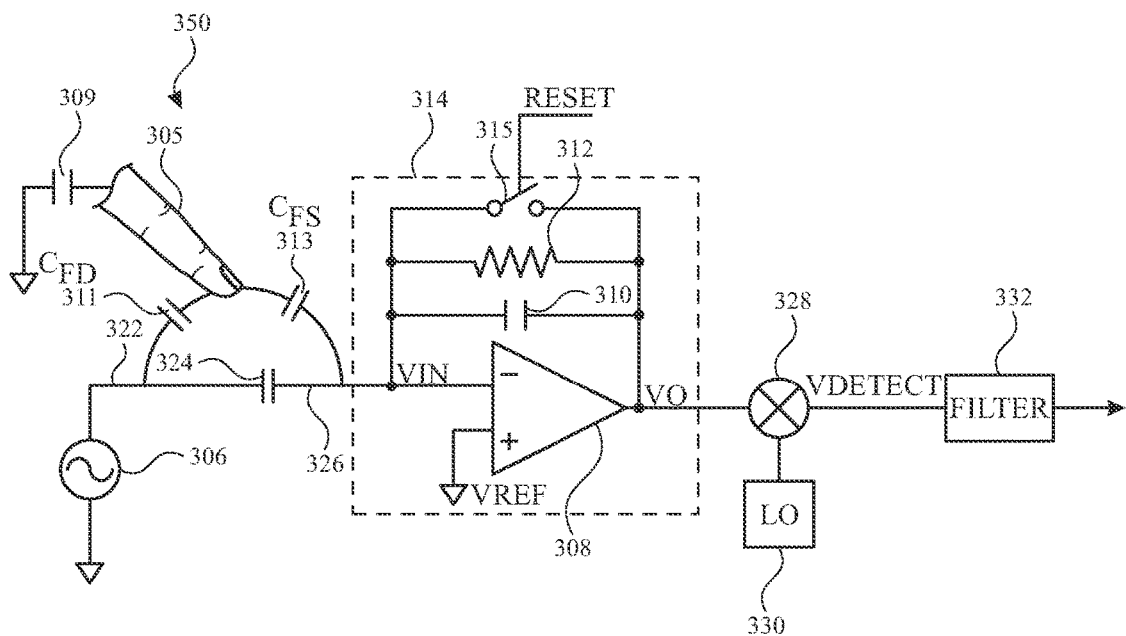
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain yin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
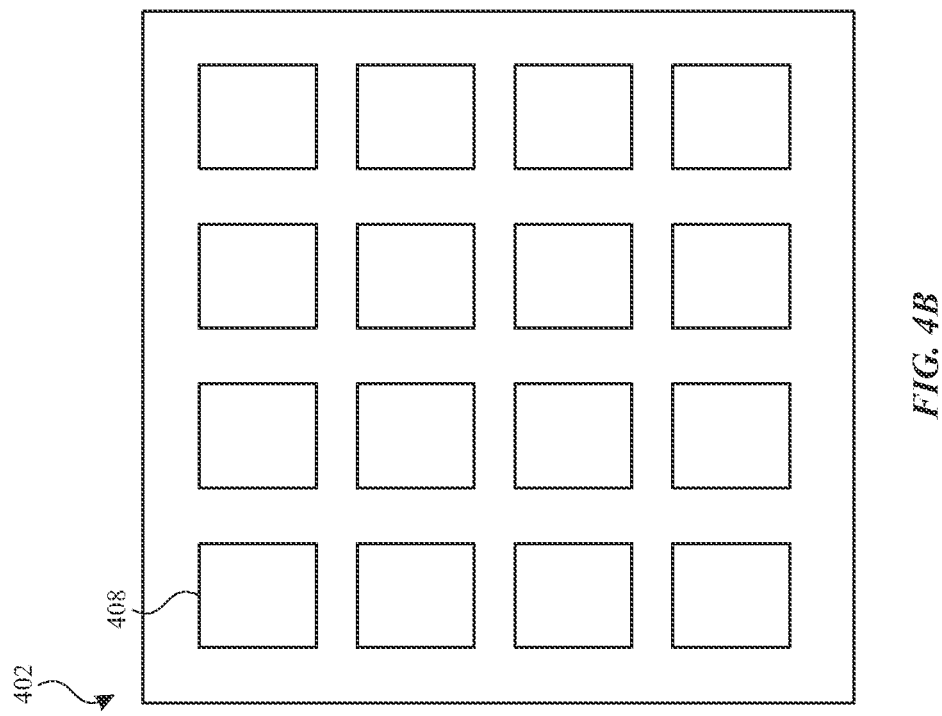
FIG. 4B illustrates touch screen with touch node electrodes arranged in a pixelated touch node electrode configuration according to examples of the disclosure.
Figure 4A:
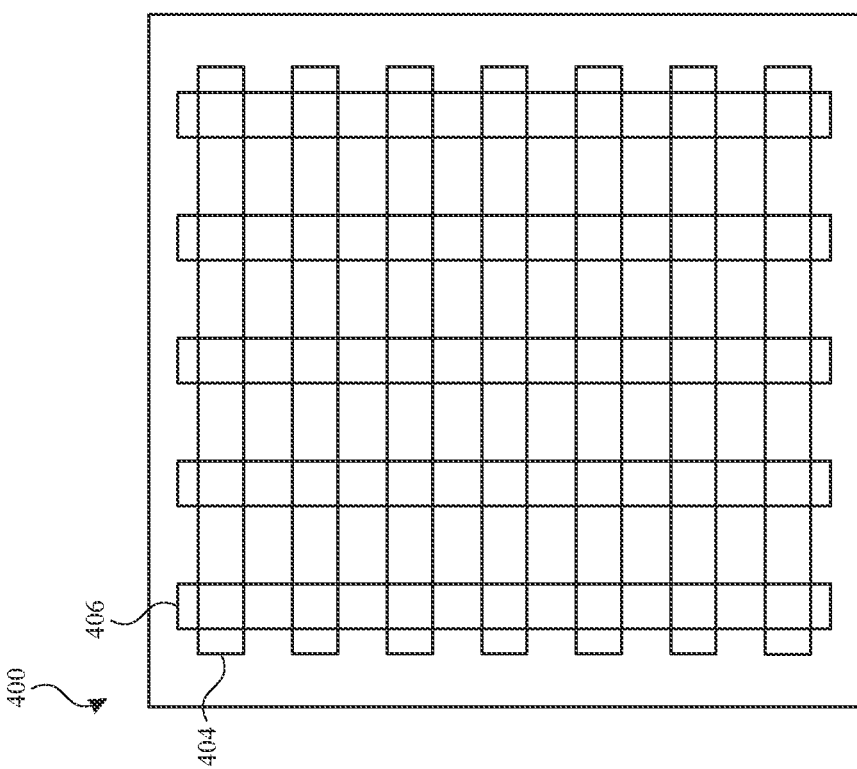
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor.

In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

Although FIG. 4A illustrates touch electrodes 404 and touch electrodes 406 as rectangular electrodes, in some examples, other shapes and configurations are possible for row and column electrodes. For example, in some examples, some or all row and column electrodes can be formed from multiple touch electrodes formed on one side of substrate from a transparent (partially or fully) semiconductor material. The touch electrodes of a particular row or column can be interconnected by coupling segments and/or bridges. Row and column electrodes formed in a layer on the same side of a substrate can be referred to herein as a single-sided sensor. As described in more detail below, row and column electrodes can have other shapes. For example, interlocking rectangle and U-shaped conductive segments of FIGS. 6A-6B, interlocking L-shaped conductive segments of FIG. 6C, interlocking two-barred cross and E-shaped conductive segments of FIGS. 7A-7B, a diamond architecture in which a plurality of diamond-shaped touch electrodes (touch electrodes having diamond shapes) are arranged to form rows and a plurality of diamond-shaped touch electrodes are arranged to form columns (e.g., split-diamond shaped conductive segments of FIG. 9). Additionally, in some examples, a non-rectilinear arrangement can be used (e.g., as illustrated in FIG. 8).

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

As described herein, in some examples, touch electrodes of the touch screen can be differentially driven and/or differentially sensed. Differential driving and differential sensing can reduce noise in the touch and/or display systems of the touch screen that may arise due to the proximity of the touch system to the display system. For example, the touch screen may include touch electrodes that are disposed partially or entirely over the display (e.g., a touch sensor panel laminated to a display, or otherwise integrated on or in the display stack-up), or otherwise in proximity to the display. For example, touch electrodes (e.g., formed of metal mesh) may capacitive couple with display electrodes (e.g., cathode electrodes), which can result in display operation injecting noise into the touch electrodes (e.g., reducing the touch sensing performance). Additionally, touch operation (e.g., stimulating touch electrodes) can result in injecting noise in the display (e.g., introducing image artifacts). Differential driving and differential sensing can cause most noise coupled into the sensing circuitry due to the display to be common mode and the common mode noise can be rejected by the differential sensing circuitry. Likewise, the differential driving can reduce local imbalance on display electrodes from touch electrodes. Thus, differential driving can cause the cathode of the display to shield the display from the touch operation, which can lower injected noise into the display system (and/or allow for more headroom to increase the amplitude of drive signals compared with a non-differential driving scheme).

As described herein, differential driving refers to concurrently driving a first of two drive electrodes with a first stimulation signal (e.g., a sine wave, a square wave, etc.) and a second of two drive electrodes with a second stimulation signal that is 180 degrees out of phase with the first stimulation signal (e.g., an inverted sine wave, an inverted square wave, etc.). In some examples, the first and second stimulation signals can be driven by a differential driving circuit. In some examples, the first and second stimulation signals can be driven by two single-ended driving circuits. Differential driving can be extended for more than two drive electrodes such that for N concurrently driven drive electrodes, one half of the drive electrodes can be concurrently driven with a first set of stimulation signals and the other half of the drive electrodes can be concurrently driven with a second set of stimulation signals complimentary to the first set (e.g., an inverted version of the first set). As described herein, differential sensing refers to sensing two sense electrodes differentially. For example, a first of the two sense electrodes can be input into a first terminal of a differential amplifier (e.g., the inverting input) and a second of the two sense electrodes can be input into a second terminal of the differential amplifier (e.g., the non-inverting input). In some examples, the differential sensing can be implemented with two single-ended amplifiers (e.g., sensing circuit 314) each sensing one sense electrode and two ADCs configured to convert the outputs of the two single-ended amplifier to a digital output. The differential can be computed between the digital outputs of the two amplifiers (e.g., in the analog or digital domain). In some examples, using differential amplifiers (rather than two single-ended amplifiers) may provide improved input referred noise for the differential part of the signal (removing common mode noise, and reducing the dynamic range). In some examples, using single-ended amplifiers (rather than a differential amplifiers) may provide output representative of common mode noise that may be useful for the system.

Figure 5A:
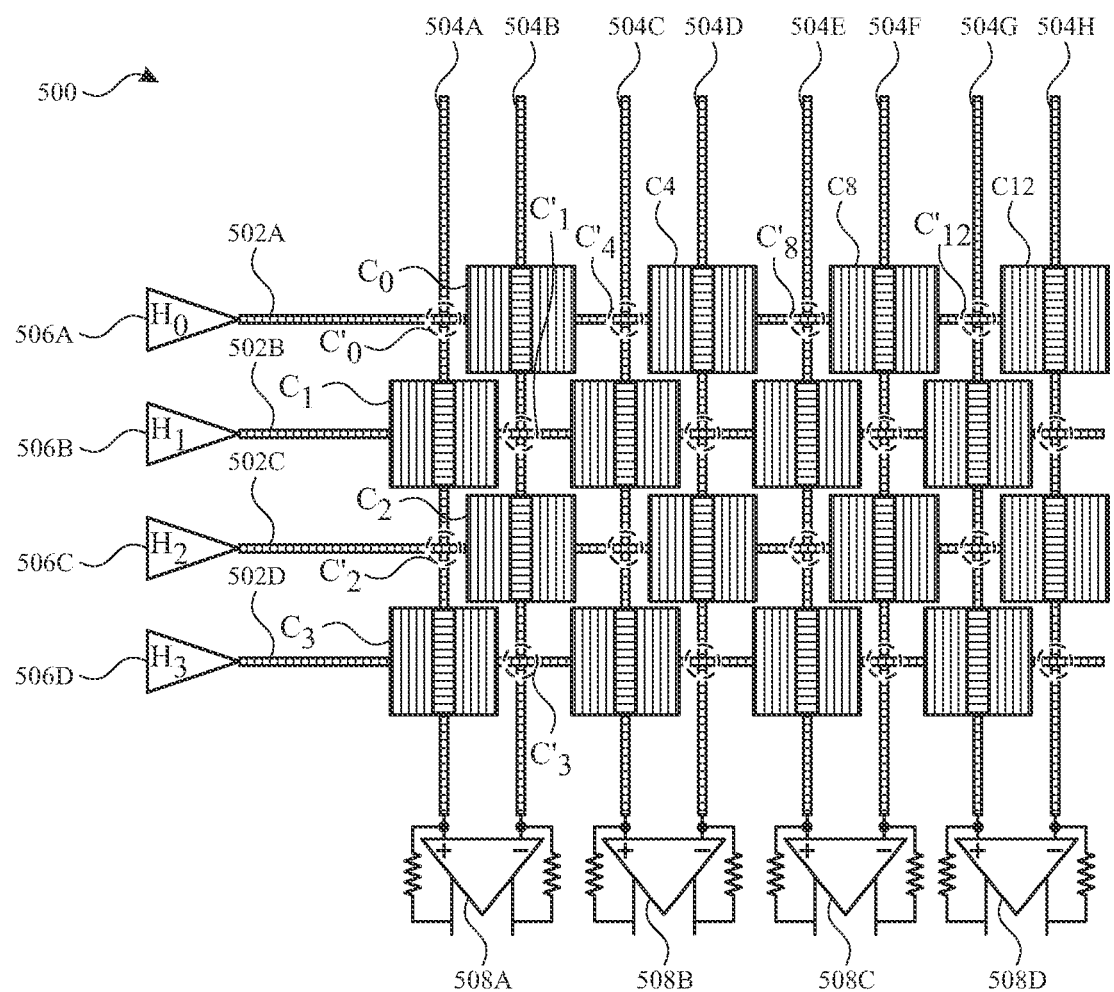
FIG. 5A illustrates a symbolic representation of a touch sensor panel implementing differential sensing according to examples of the disclosure.

FIG. 5A illustrates a symbolic representation of a touch sensor panel implementing differential sensing according to examples of the disclosure. FIG. 5A illustrates a touch sensor panel 500 including row electrodes 502A-502D (also referred to as drive electrodes or lines) and column electrodes 504A-504H (also referred to as sense electrodes or lines). Touch sensor panel 500 can also include drive circuitry (e.g., drivers/transmitters 506A-506D that can correspond to driver logic 214) configured to drive row electrodes 502A-502D and sense circuitry (e.g., differential amplifiers 508A-508D that can correspond to a part of sense channels 208) configured to sense column electrodes 504A-504H. It should be understood that although the terms "row" and "column" may be used throughout this disclosure in conjunction with figures showing row and column arrangements, these terms are used for convenience of explanation, and actual orientations can be interchanged in accordance with embodiments of the disclosure.

In particular, touch sensor panel 500 illustrates a touch sensor panel with four row electrodes 502A-502D and eight column electrodes 504A-504H. Each driver/transmitter 506A-506D can be coupled to a respective one of the row electrodes 502A-502D (e.g., driver/transmitter 506A can be coupled to row electrode 502A, driver/transmitter 506B can be coupled to row electrode 502B, etc.). Each differential amplifier 508A-508D can be coupled to a respective pair of the column electrodes 504A-504H (e.g., differential amplifier 508A can be coupled to column electrodes 504A-504B, differential amplifier 508B can be coupled to column electrodes 504C-504D, etc.). The differential amplifiers 508A-508D can each include a common mode feedback circuit (e.g., including resistive and/or capacitive circuit elements) to keep the inputs at virtual ground. A first column electrode of the respective pair of column electrodes can be coupled to an inverting terminal of corresponding differential amplifier and a second column electrode of the respective pair of column electrodes can be coupled to the non-inverting terminal of the corresponding differential amplifier.

Touch sensor panel 500 can be driven and sensed to detect sixteen capacitance values. Technically, a mutual capacitance (electrostatic fringe field) may be formed between the intersection (or adjacency) of each row electrode and each column electrode. For example, a first mutual capacitance, $C_0'$, can be formed between row electrode 502A and column electrode 504A and a second mutual capacitance, $C_0$, can be formed between row electrode 502A and column electrode 504B. However, as represented in FIG. 5A, the amount of conductive material at some of the intersections (or adjacencies) of row electrodes and column electrodes may be smaller than the amount of conductive material at the intersections (or adjacencies) of other row electrodes. For example, as represented in FIG. 5A, the amount of conductive material at the intersection of row electrode 502A and column electrode 504A can be less than the amount of conductive material at the intersection of row electrode 502A and column electrode 502B. As a result, the mutual capacitance (electrostatic fringe field) of the former can be relatively negligible with respect to the latter, such that the mutual capacitance of the former can be essentially ignored, in some examples. (In some examples, the relatively negligible capacitance can be reduced by increasing the distance between certain portions of the row and column electrodes and or electrically isolating certain portions of the row and column electrodes.) For example, the mutual capacitance between row electrode 502A and column electrode 504A ($C_0'$) can be relatively small compared with the mutual capacitance between row electrode 502A and column electrode 504B ($C_0$) or the mutual capacitance of row electrode 502B and column electrode 504A ($C_1$).

For each respective driver and a respective differential sense amplifier in FIG. 5A, one of the mutual capacitances can be a dominant (or major) mutual capacitance and one of the mutual capacitances can be a minor mutual capacitance (where the mutual capacitance/electrostatic fringe field can be a function of the amount of conductive material and arrangement of conductive material). In some examples, the dominant mutual capacitance can correspond to fringe field coupling above a threshold for the respective driver/differential amplifier (e.g., above 80%, 85%, 90%, 95%, etc.) and the minor mutual capacitance can correspond to fringe field coupling below a threshold for the respective driver/differential amplifier (e.g., below 20%, 15%, 10%, 5%, etc.). Thus, the sixteen values measured for touch sensor panel 500 can represent the dominant mutual capacitances by virtue of the pattern of conductive material for the row electrodes and column electrodes. For example, $C_0$ can represent a dominant mutual capacitance between row electrode 502A and column electrode 504B, $C_1$ can represent a dominant mutual capacitance between row electrode 502B and column electrode 504A, $C_2$ can represent a dominant mutual capacitance between row electrode 502C and column electrode 504B, and $C_3$ can represent a dominant mutual capacitance between row electrode 502D and column electrode 504A. Each of these dominant mutual capacitances can represent an effective touch node for the touch sensor panel. In some examples, the "effective touch node" described herein can be alternatively referred to as the "touch node" because it can represent the dominant mutual capacitance for the region of the touch sensor panel.

The dominant mutual capacitance (relatively high electrostatic fringe field) and minor mutual capacitances (relatively low electrostatic fringe field) can be spatially alternating, in some examples. The spatially alternating can appear along one or both dimensions. For example, for driver 506A/row electrode 502A, dominant capacitances $C_0$, $C_4$, $C_8$, $C_{12}$ (formed with column electrode 504B, 504D, 504F, 504H and the inverting terminal of differential amplifiers 508A-508D) can alternate spatially with minor capacitances $C_0'$, $C_4'$, $C_8'$, $C_{12}'$. For the remaining drivers/row electrodes, the dominant and minor capacitances can alternate spatially as well. For the inverting terminal of differential amplifier 508A/column electrode 504B, dominant capacitances $C_0$ and $C_2$ (formed with row electrode 502A and 502C and corresponding driver 506A and 506C) can alternate spatially with minor capacitances $C_1'$ and $C_3'$. For the non-inverting terminal of differential amplifier 508A/column electrode 504A, dominant capacitances $C_1$ and $C_3$ (formed with row electrode 502B and 502D and corresponding driver 506B and 506D) can alternate spatially with minor capacitances $C_1'$ and $C_2'$. For the remaining differential amplifier/column electrodes, the dominant and minor capacitances can alternate spatially as well.

During operation, row electrodes 502A-502D can be stimulated with a multi-stimulus pattern of drive signals (H0-H3), and column electrodes 504A-504H can be differentially sensed using differential amplifiers 508A-508D. For example, the multi-stimulus pattern can be a Hadamard matrix (e.g., a 4×4 matrix including "1" and "−1" values, indexed to driver and drive step) applied to a common stimulation signal (e.g., a sine wave, a square wave, etc.) to encode the drive signals. The multi-stimulus pattern can allow for the dominant mutual capacitances to be measured and decoded based on the multi-stimulus drive pattern. Differentially sensing the column electrodes can remove common mode noise from the touch measurements. It should be understood that although touch sensor panel 500 includes sixteen dominant capacitance values (e.g., corresponding to sixteen touch nodes in a 4×4 array), that the touch sensor panel can be scaled up or down to include fewer or more touch nodes.

Figure 5B:
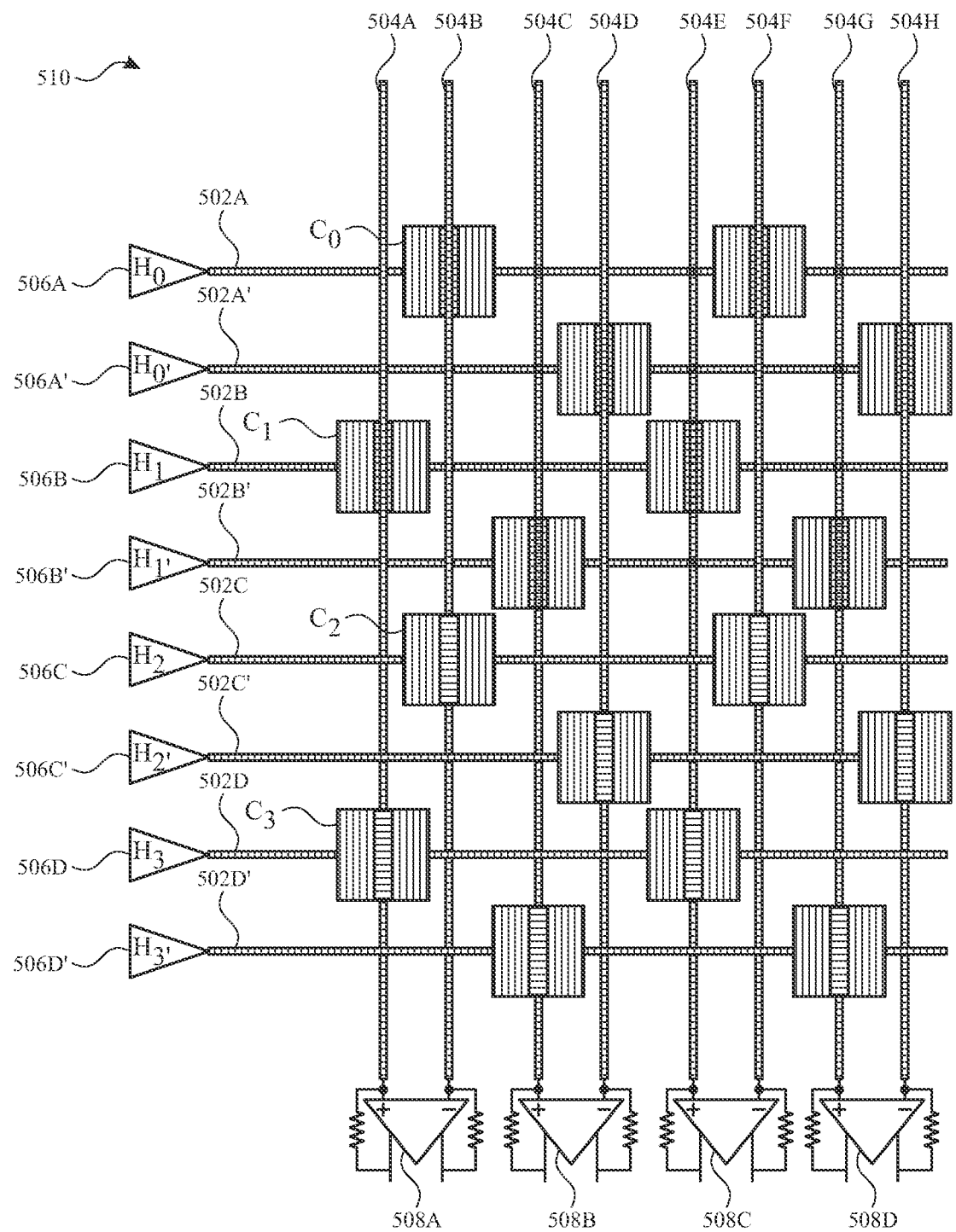
FIG. 5B illustrates a symbolic representation of a touch sensor panel implementing differential driving and differential sensing according to examples of the disclosure.

In some examples, to reduce noise and thereby improve signal-to-noise ratio (SNR), touch sensor panel 500 can be modified to implement differential driving. For example, rather than implementing one drive line per row of effective touch nodes, two drive lines can be used per row of effective touch nodes. FIG. 5B illustrates a symbolic representation of a touch sensor panel implementing differential driving and differential sensing according to examples of the disclosure. FIG. 5B illustrates a touch sensor panel 510 including row electrodes 502A-502D and row electrodes 502A'-502D' (eight row electrodes) and column electrodes 504A-504H (eight column electrodes). Touch sensor panel 500 can also include drive circuitry (e.g., drivers/transmitters 506A-506D and drivers/transmitters 506A'-506D') configured to drive row electrodes 502A-502D and 502A'-502D' and sense circuitry (e.g., differential amplifiers 508A-508D) configured to sense column electrodes 504A-504H.

Each driver/transmitter 506A-506D, 506A'-506D' can be coupled to a respective one of the row electrodes 502A-502D, 502A'-502D' and each differential amplifier 508A-508D can be coupled to a respective pair of the column electrodes 504A-504H. Despite doubling the row electrodes compared with touch sensor panel 500, touch sensor panel 510 can be driven and sensed to detect sixteen dominant mutual capacitance values (represented in FIG. 5A by the relatively large amount of conductive material of some row electrodes and column electrodes). The sixteen dominant mutual capacitance values can represent a 4×4 array of touch nodes for the touch sensor panel. During operation, row electrodes 502A-502D and row electrodes 502A'-502D' can be stimulated with a multi-stimulus pattern of drive signals (H0-H3 and H0'-H3'), and column electrodes 504A-504H can be differentially sensed using differential amplifiers 508A-508D. In some examples, the multi-stimulus pattern can be two orthogonal Hadamard matrices (e.g., each a 4×4 matrix including "1" and "−1" values, indexed to driver and drive step) applied to a common stimulation signal (e.g., a sine wave, a square wave, etc.) to encode the drive signals. In some examples, the multi-stimulus pattern can be one Hadamard matrix and its complimentary signals (180 degrees out of phase) applied to a common stimulation signal (e.g., a sine wave, a square wave, etc.) to encode the drive signals. The multi-stimulus pattern can allow for the dominant mutual capacitances to be measured and decoded based on the multi-stimulus drive pattern. Differentially sensing the column electrodes can remove common mode noise from the touch measurements. It should be understood that although touch sensor panel 510 includes sixteen dominant capacitance values (e.g., corresponding to sixteen touch nodes), that the touch sensor panel can be scaled up or down to include fewer or more touch nodes.

As described with respect to FIG. 5A, the dominant mutual capacitance (relatively high electrostatic fringe field) and minor mutual capacitances (relatively low electrostatic fringe field) can be spatially patterned in FIG. 5B. In some examples, the spatial alternating can appear along one or both dimensions. For example, for driver 506A/row electrode 502A, dominant capacitances can be formed at intersections with column electrodes 504B and 504F, with minor capacitances formed at the remaining intersections with columns electrodes 504A, 504C-504E, 504G and 504H. In a similar manner, driver 506B/row electrode 502A', dominant capacitances can be formed at intersections with column electrodes 504D and 504H, with minor capacitances formed at the remaining intersections with columns electrodes 504A-504C and 504E-504G. The spatial pattern of dominant and minor capacitances can repeat for the remaining rows. For the inverting terminal of differential amplifier 508A/column electrode 504B, dominant capacitances $C_0$ and $C_2$ can be formed at intersections with row electrode 502A and 502C and corresponding driver 506A and 506C, with minor capacitances at the remaining intersections for column 504B. For the non-inverting terminal of differential amplifier 508A/column electrode 504A, dominant capacitances $C_1$ and $C_3$ can be formed at intersections with row electrode 502B and 502D, with minor capacitances at the remaining intersections for column 504A. The spatial pattern of dominant and minor capacitances can repeat for the remaining columns. Thus, along the rows and along the columns, the dominant capacitances can be spatially separated from each other by three minor capacitances in the spatial pattern of FIG. 5B.

Figure 6A:
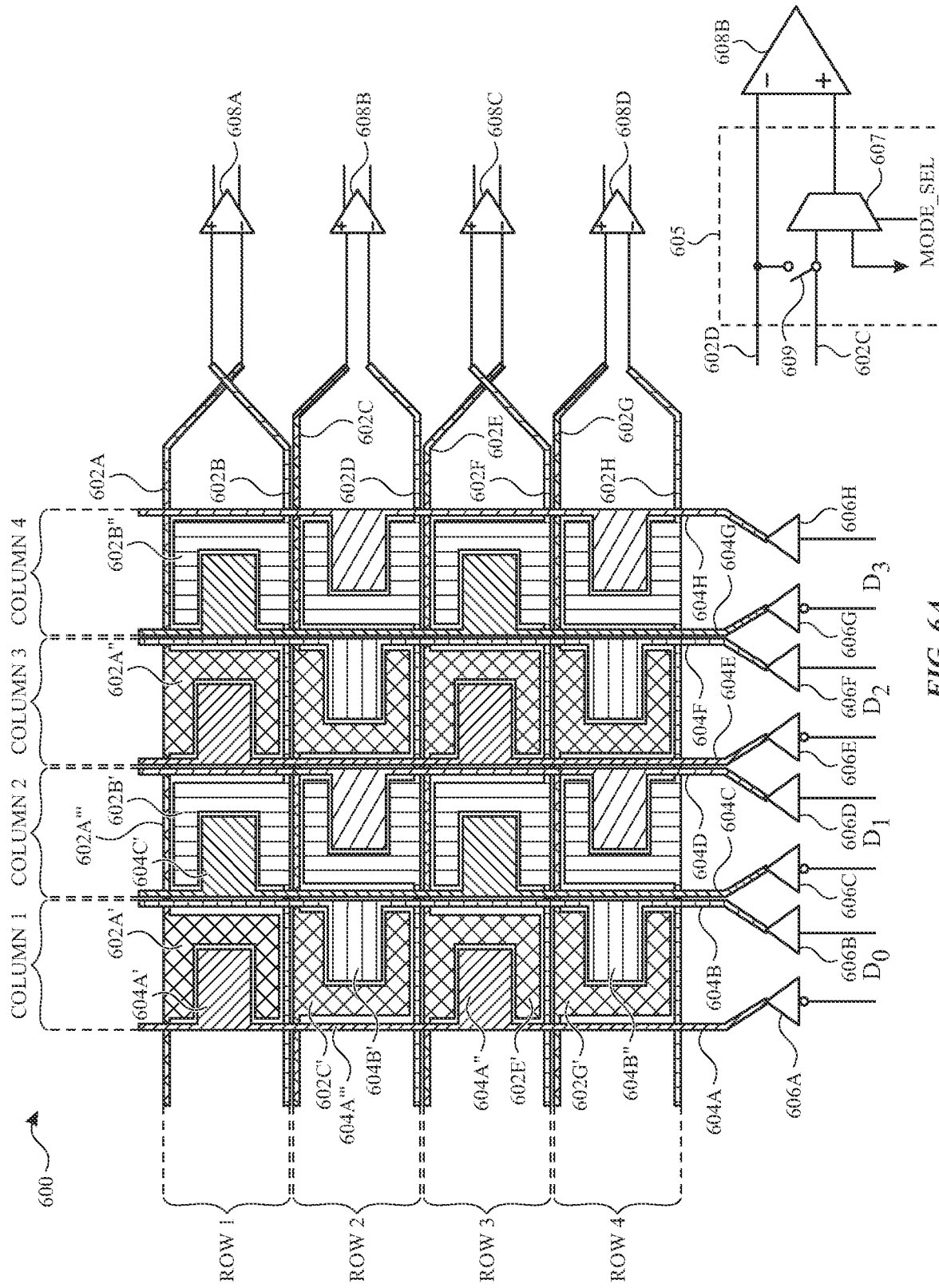
FIGS. 6A-6C illustrate touch sensor panels implementing differential driving and differential sensing according to examples of the disclosure.
Figure 6B:
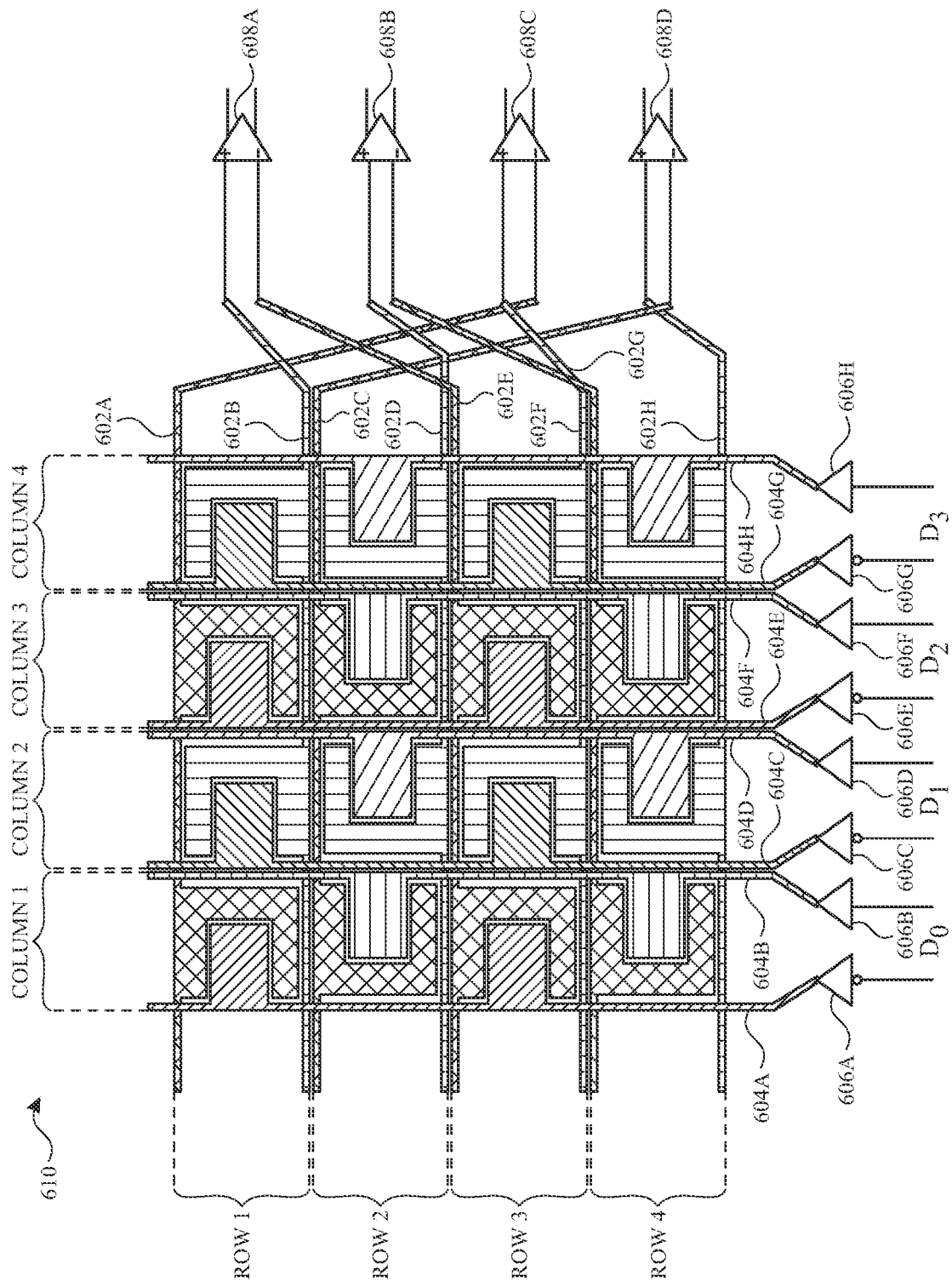
Figure 6C:
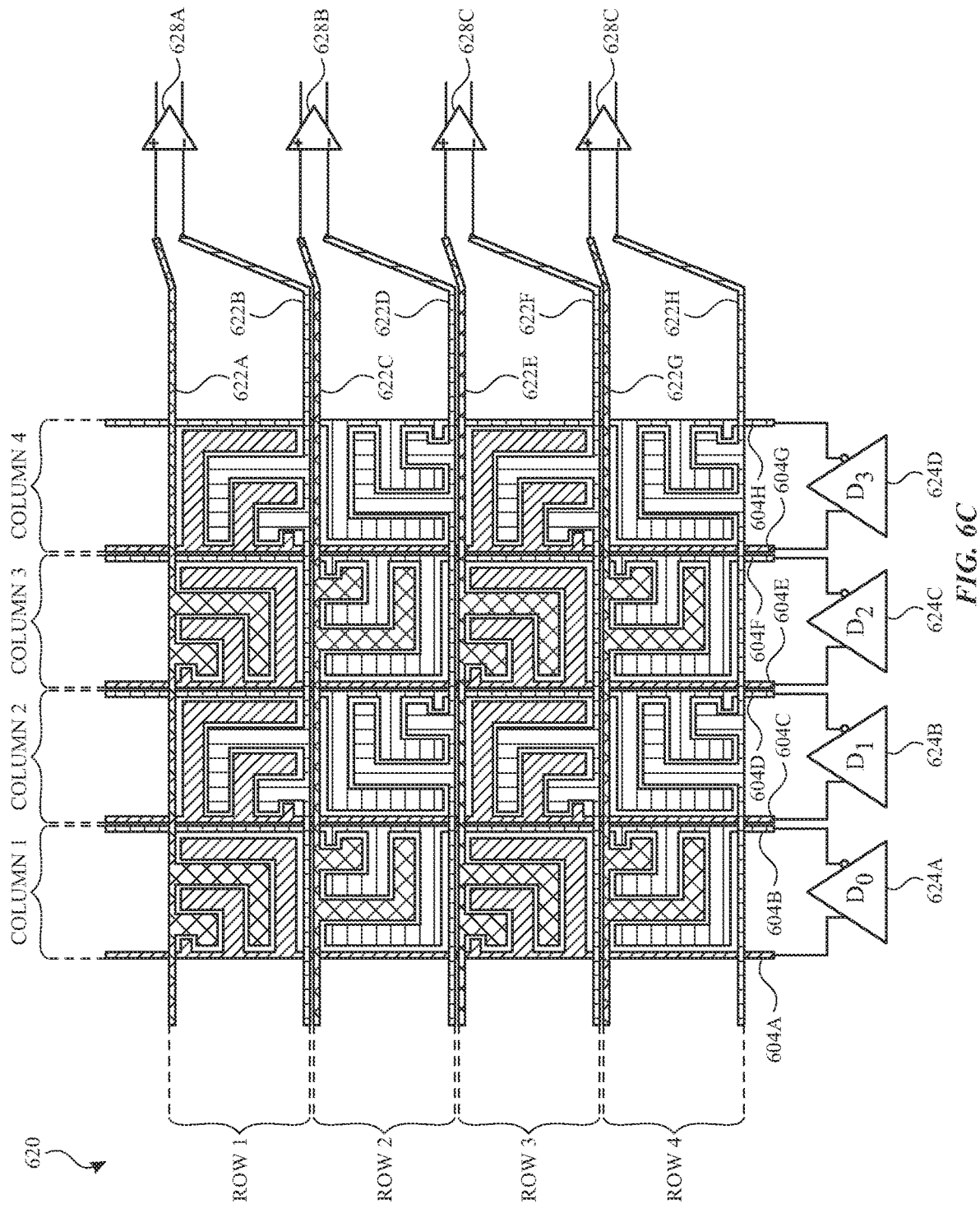

FIGS. 6A-6C illustrate touch sensor panels implementing differential driving and differential sensing according to examples of the disclosure. Touch sensor panels of FIGS. 6A-6C can have mutual capacitance/electrostatic fringe field coupling with a spatial pattern, in a manner similar to described above with respect to FIG. 5B. FIG. 6A illustrates a touch sensor panel 600 including row electrodes 602A-602H and column electrodes 604A-604H. Touch sensor panel 600 can also include drive circuitry (e.g., drivers/transmitters 606A-606H that can correspond to driver logic 214) configured to drive column electrodes 604A-604H and sense circuitry (e.g., differential amplifiers 608A-608D including common mode feedback circuits that can correspond to a part of sense channels 208) configured to sense row electrodes 602A-602H. In particular, FIG. 6A illustrates touch sensor panel 600 with eight row electrodes 602A-602H and eight column electrodes 604A-604H. Each driver/transmitter 606A-606D can be coupled to a respective one of the column electrodes 604A-604H (e.g., driver/transmitter 606A can be coupled to column electrode 604A, driver/transmitter 606B can be coupled to column electrode 604B, etc.). Each differential amplifier 608A-608D can be coupled to a respective pair of row electrodes 602A-602H (e.g., differential amplifier 608A can be coupled to row electrodes 602A-602B, differential amplifier 608B can be coupled to row electrodes 6002C-602D, etc.). A first row electrode of the respective pair of row electrodes can be coupled to an inverting terminal of a corresponding differential amplifier and a second row electrode of the respective pair of row electrodes can be coupled to the non-inverting terminal of the corresponding differential amplifier.

Column electrodes 604A-604H can include multiple conductive segments interconnected by routing. For example, column electrode 604A includes conductive segments 604A' and 604A" (e.g., of a rectangular shape) forming the effective touch nodes of touch sensor panel 600 that are connected by routing such as routing 604A'''. Likewise, row electrodes 602A-602H can include multiple conductive segments interconnected by routing. For example, row electrode 602A includes conductive segments 602A' and 602A" (e.g., of a "U" shape) forming the effective touch nodes of touch sensor panel 600 that are connected by routing such as routing 602A'''. Touch sensor panel 600 can be viewed as including a two-dimensional array (four rows and four columns) of effective touch nodes. Each effective touch node of touch sensor panel 600 can measure a capacitance dominated by the capacitance between the conductive segments of respective row and column electrodes (formed from interlocking conductive segments). For example, the mutual capacitance between portion 602A' of row electrode 602A and portion 604A' of column electrode 604A can dominate for the effective touch node corresponding to the region of column 1 and row 1 of touch sensor panel 600. The capacitive contributions of the routing portions of nearby row or column electrodes can form minor mutual capacitances that can be negligible in comparison (e.g., the contribution from the routing portion of column electrode 604B to portion 602A' of row electrode 602A). As a result of the pattern of the row and column electrodes, the dominant/minor mutual capacitance/electrostatic fringe field coupling can be spatially patterned, as described herein. For example, column electrode 606A can dominantly couple with row electrodes 602A and 602E, with minor coupling for row electrodes 602B-602D and 602F-602H. Row electrode 602A can dominantly couple with column electrode 604A and 604E, with minor coupling for column electrodes 604B-604D and 604F-604H. The spatial pattern of dominant/ minor mutual capacitance/electrostatic fringe field coupling can continue in a similar manner. It should be noted that the size of the routing is exaggerated for illustration purposes and the routings size relative to the conductive segments may be even smaller than shown. In some examples, the conductive segments of row and column electrodes are formed in a common layer (i.e., the same layer of the touch sensor panel). In some examples, the routing of the row and column electrodes can be formed at least in part in the common layer. In some examples, some or all of the routing can be in a different layer (e.g., to allow for electrical separation where the electrodes overlap in the illustration, and to further reduce the contribution of the routing to the capacitance at the effective touch nodes).

As illustrated in FIG. 6A, touch sensor panel 600 can include four rows and four columns of touch nodes (e.g., effective touch nodes). For example, a first column of touch nodes can be formed primarily from the conductive segments of row electrodes 602A, 602C, 602E, 602G and the conductive segments of column electrodes 604A, 604B (e.g., segments 604A', 604A'', 604B' and 604B''). As another example, a second column of touch nodes can be formed primarily from the conductive segments of row electrodes 602B, 602D, 602F, 602H and the conductive segments of column electrodes 604C, 604D. In a similar manner, a first row of touch nodes can be formed primarily from the conductive segments of row electrodes 602A and 602B (e.g., segments 602A', 602A'', 602B' and 602B'') and the conductive segments of column electrodes 604A, 604C, 604E and 604G. As another example, a second row of touch nodes can be formed primarily from the conductive segments of row electrodes 602C and 602D and the conductive segments of column electrodes 604B, 604D, 604F and 604H.

During operation, the drive circuitry coupled to the column electrodes can differentially drive the column electrodes and differential amplifiers can differentially sense the row electrodes. For example, column electrodes 604A-604H can be stimulated (e.g., concurrently) with a multi-stimulus pattern of drive signals (D0-D3) over multiple scan steps. For example, the multi-stimulus pattern can be a Hadamard matrix including values of 1 (for phase of 0 degrees) and −1 (for phase of 180 degrees) applied to a common stimulation signal (e.g., a sine wave at frequency $f_1$) to encode the drive signals, allowing for the dominant mutual capacitances to be measured and decoded based on the multi-stimulus drive pattern. For example, D0-D3 can be represented by the following Hadamard matrix:

$$\begin{bmatrix} 1 & -1 & -1 & -1 \\ -1 & 1 & -1 & -1 \\ -1 & -1 & 1 & -1 \\ -1 & -1 & -1 & 1 \end{bmatrix}$$

wherein each row in the matrix represents a step of the scan, and each column representing one of the drive signals D0-D3, such that the values of the matrix represent the phase applied to the common stimulation signal for D0, D1, D2, and D3 for each step. For each drive signal in the multi-stimulus pattern of drive signals, a complimentary signal can be applied concurrently (e.g., drive signals D0-D3 and D0'-D3'). For example, the first row corresponding to the first scan step indicates that drive signal D0 has a phase of 180 degrees. Drive signal D0 can be applied differentially to column electrodes 604A and 604B such that the signal applied to column electrode 604A is 180 degrees out of phase with the signal applied to column electrode 604B. According to the example Hadamard matrix above driver/buffer 606A outputs a drive signal with a phase of 0 after the inversion and driver/buffer 606B outputs a drive signal with a phase of 180 degree. In a similar manner, two complimentary drive signals can be applied to the touch sensor panel for each of the drive signals D0-D3. For example, the first row corresponding to the first scan step indicates that drive signals D1-D3 have a phase of 0, such that driver/buffers 606D, 606F and 606H output a drive signal with a phase of 0 and driver/buffers 606C, 606E and 606G output a drive signal with a phase of 180 degree after the inversion. The drive signals can be output for the drive lines according to the remaining rows of the Hadamard matrix for the subsequent three scan steps.

Considering an example receiver of differential amplifier 608D, for drive signal D0, the minor coupling between column electrode 604A and row electrode 602G can be relatively small compared with the dominant coupling of between column electrode 604B and row electrode 602G (e.g., via fringe field coupling between segment 604B'' and 602G'). The dominant coupling can be represented by capacitance C0 (for row 4, column 1) that is coupled to the non-inverting (positive) input terminal of differential amplifier 608D. Thus, a current proportional to C0 can appear at the output of differential amplifier 608D. In a similar manner, for drive signal D1, the dominant coupling between column electrode 606D and row electrode 602H can be represented by capacitance C1 (for row 4, column 2), that is coupled to the inverting (negative) input terminal of differential amplifier 608D and a current proportional to C1 can appear at the output of differential amplifier 608D; for drive signal D2, the dominant coupling between column electrode 606F and row electrode 602G can be represented by capacitance C2 (for row 4, column 3), that is coupled to the non-inverting input terminal of differential amplifier 608D and a current proportional to C2 can appear at the output of differential amplifier 608D; and for drive signal D3, the dominant coupling between column electrode 606H and row electrode 602H can be represented by capacitance C3 (for row 4, column 4), that is coupled to the inverting input terminal of differential amplifier 608D and a current proportional to C3 can appear at the output of differential amplifier 608D. Thus, the output of the measurement of the current by differential amplifier 608D for the first scan step can be proportional to C0-C1-C2-C3. Following the same procedure for the remaining three steps, the output for the four scan steps can be represented as a vector proportional to:

$$\begin{bmatrix} C_0 - C_1 - C_2 - C_3 \\ -C_0 + C_1 - C_2 - C_3 \\ -C_0 - C_1 + C_2 - C_3 \\ -C_0 - C_1 - C_2 + C_3 \end{bmatrix}$$

This vector encoding can be decoded or inverted by the matrix, extracting the individual capacitances, but with an effective integration time of the entire measurement, as shown by the equation below:

$$\begin{bmatrix} C_0 \\ C_1 \\ C_2 \\ C_3 \end{bmatrix} = \begin{bmatrix} 1/4 & -1/4 & -1/4 & -1/4 \\ -1/4 & 1/4 & -1/4 & -1/4 \\ -1/4 & -1/4 & 1/4 & -1/4 \\ -1/4 & -1/4 & -1/4 & 1/4 \end{bmatrix} \begin{bmatrix} C_0 - C_1 - C_2 - C_3 \\ -C_0 + C_1 - C_2 - C_3 \\ -C_0 - C_1 + C_2 - C_3 \\ -C_0 - C_1 - C_2 + C_3 \end{bmatrix}$$

Although FIG. 6A illustrates the drive circuitry as including eight discreet drivers 606A-606H, it should be understood that other implementations are possible. For example, four differential drivers can be used, where each of differential drivers outputs a signal and its compliment.

In some examples, the complimentary drive signals can be applied to adjacent column electrodes such that the net electrical effect due to the drive signal can be zero (or within a threshold of zero) localized to the two column electrodes. For example, adjacent column electrodes 604A and 604B (or 604B and 604C) can be driven with the complimentary signals and result in a net zero (or near zero) electrical effect (e.g., to reduce noise from the touch system coupled into the display system). Although applying complimentary signals is shown in adjacent electrodes, it is understood that the complimentary signal can be applied to a non-adjacent column electrode such that the net electrical effect may be zero (or within a threshold of zero) for the touch sensor panel, but may not be zero at localized regions of the touch sensor panel.

For each column of touch nodes in touch sensor panel 600, a first drive signal and a second drive signal can be applied. For example, column 1 of touch sensor panel can be driven with a first drive signal on column electrode 604A (applied to two touch nodes in the column of touch nodes) and can be driven with a second drive signal on column electrode 604B (applied to two different touch nodes in the column of touch nodes). As shown in FIG. 6A, the first drive signal is applied to alternating touch nodes in the column and the second drive signal is applied to alternating touch nodes in the column.

Row electrodes 602A-602H can be differentially sensed using differential amplifiers 608A-608D. Differentially sensing the column electrodes can remove common mode noise from the touch measurements. In some examples, the coupling between the row electrodes and the differential amplifiers can correspond to the drive signals applied to the column electrodes. For example, row electrodes driven by inverted drive signals can couple to opposite terminals of the corresponding differential amplifier as compared with row electrodes driven by non-inverted drive signals. For example, for the first row of touch sensor panel 600, segments 602A' and 602A" of row electrode 602A can be driven primarily by the inverted drive signals applied to the segments of column electrodes 604A and 604E. These segments 602A' and 602A" can be coupled to the inverting terminal of differential amplifier 608A. Segments 602B' and 602B" of row electrode 602B can be driven primarily by the inverted drive signals applied to the segments of column electrodes 604C and 604G can be coupled to the non-inverting terminal of differential amplifier 608A. In contrast, for the second row of touch sensor panel 600, segments of row electrode 602C of touch nodes driven primarily by the non-inverted drive signals applied to the segments of column electrodes 604B and 604F can be coupled to the non-inverting terminal of differential amplifier 608B. Segments of row electrode 602D of touch nodes driven primarily by the non-inverted drive signals applied to the segments of column electrodes 604D and 604H can be coupled to the inverting terminal of differential amplifier 608B. Reversing the polarity of the connections between row electrodes and terminals of the differential for non-inverting drive signals as compared with inverting drive signals can account for the polarity difference between the complimentary drive signals, and can result in uniform phase at the output of the sensing circuitry.

Although applying complimentary signals is shown in adjacent electrodes for each column (e.g., the complementary signals D0/D0' are applied to column 1, the complementary signals D1/D1' are applied to column 2, etc.), it is understood that the complimentary signal can be applied to different column electrodes such that the net electrical effect may be zero (or within a threshold of zero) over a larger localized region the touch sensor panel (e.g., across diagonal touch nodes), but may not be net zero within a column of the touch sensor panel (e.g., for adjacent touch nodes). In some examples, the cancelation of the complimentary signals can occur on diagonal touch nodes. For example, the drive circuitry can be configured to drive column electrode 604A with D0', column electrode 604B with D1, column electrode 604C with D1' and column electrode 604D with D0. As a result, the cancelation of the transmit signals can occur at diagonals. For example, the cancelation of D0' and D0 can occur between the transmitter electrode for the touch node in row 1, column 1 of the array of FIG. 6A and the transmitter electrode for the touch node is row 2, column 2. In a similar manner, the cancelation of D1' and D1 can occur between the transmitter electrode for the touch node in row 1, column 2 of the array of FIG. 6A and the transmitter electrode for the touch node is row 2, column 1. In some examples, due to the increased distance along the diagonal, diagonal cancelation of the complementary drive signals can result in increased sensed signal in response to a touching object (because there is less cancelation of signal) compared with the sensed signal for a touch sensor panel with cancelation of complementary drive signals within a column of touch nodes.

In some examples, a similar improvement in touch signal can be achieved by increasing the spacing between touch nodes sensed by the receivers. For example, the transmit configuration of FIG. 6A with complimentary signals applied within a column of touch nodes can be used, but the receiver configuration can be modified. For example, differential receiver 608A can be coupled to the conductive segments of touch nodes at row 1, column 1, row 2 column 2, row 1, column 3 and row 2 column 4, such that conductive segments 602A' and 602A" remain coupled to the inverting terminal of differential amplifier 608A, but the connection can be changed such that the non-inverting terminal of differential amplifier 608A can be coupled to conductive segments for touch nodes in the second row that are diagonal to conductive 602A' and 602A". The same pattern can be repeated for remaining receivers such that complimentary receiver inputs are at diagonals to one another. In some examples, as described below with reference to FIG. 6B, the spacing between complimentary receiver inputs for a differential amplifier can be further increased to increase the touch signal (and possibly reduce the spatial resolution of noise cancelation from the differential driving/sensing scheme).

It should be understood that although touch sensor panel 600 includes a 4×4 array of sixteen dominant capacitance values (e.g., corresponding to sixteen effective touch nodes), that the touch sensor panel can be scaled up or down to include fewer or more touch nodes. For example, a touch sensor panel can be scaled to 8×8 touch nodes (e.g., 64 capacitance values for 64 effective touch nodes) by doubling the row electrodes, column electrodes, drivers/transmitters and differential amplifiers.

Additionally, it should be understood that although differential driving and sensing is described with reference to touch sensor panel 600 in FIG. 6A, that touch sensor panel 600 can, in some examples, be operated in a non-differential sensing configuration to sense stimulation from an input device (e.g., a stylus that provides) in contact or proximity to touch sensor panel 600. For example, in order to detect the input device stimulation, switching circuitry can be used to couple the two row electrodes for a row of touch nodes to the same input of a differential amplifier (e.g., inverting input), and couple another input of the differential amplifier (e.g., non-inverting input) to a ground or another reference potential (e.g., corresponding to the row electrodes being detected as one sense line using the touch circuitry in the configuration shown in FIG. 3B). In contrast, for differential driving and sensing described herein, the switching circuitry can couple the row electrodes as illustrated by differential amplifiers 608A-608D. For example, switching circuitry 605 can be optionally included between two routing traces for row electrodes 602C and 602D and corresponding differential amplifier 608B. Switching circuitry 605 can include one or more switches including multiplexer 607 and switch 609 that can be controlled by a mode selection input. In a differential drive/sense mode of operation, multiplexer 607 can couple row electrode 602C to the non-inverting terminal (and can decouple row electrode 602C from the inverting terminal by opening switch 609) and row electrode 602D can be coupled to the inverting terminal of differential amplifier 608B. In a non-differential sensing configuration to sense stimulation from an input device, row electrode 602C and row electrode 602D can be coupled to the inverting terminal of differential amplifier 608B by closing switch 609 and the non-inverting terminal of differential amplifier 608B can be coupled to ground (or a virtual ground) using multiplexer 607. In some examples, for the non-differential operation, the column electrodes in each column can use the same phase stimulation signals rather than complimentary signals (e.g., D0 can be applied to column electrodes 604A-604B for the first column, D1 can be applied to column electrodes 604C-604D for the second column, etc.).

FIG. 6B illustrates a touch sensor panel 610 similar to touch sensor panel 600, the details of which are not repeated here for brevity. However, touch sensor panel 610 can include a different coupling between row electrodes 602A-602H and differential amplifiers 608A-608D. In particular, in the configuration of touch sensor panel 610, the sensing is differential over alternating rows. For example, row electrode 602A can be coupled to differential amplifier 608C, row electrode 602B can be coupled to differential amplifier 608A, row electrode 602C can be coupled to differential amplifier 608D, row electrode 602D can be coupled to differential amplifier 608B, row electrode 602E can be coupled to differential amplifier 608A, row electrode 602F can be coupled to differential amplifier 608C, row electrode 602G can be coupled to differential amplifier 608B, and row electrode 602H can be coupled to differential amplifier 608D. In other words, differential amplifier 608A can measure the differential between row electrodes 602B and 602E (of alternating rows 1 and 3), differential amplifier 608B can measure the differential between row electrodes 602D and 602G (of alternating rows 2 and 4), differential amplifier 608C can measure the differential between row electrodes 602F and 602A (of alternating rows 1 and 3), and differential amplifier 608D can measure the differential between row electrodes 602H and 602C (of alternating rows 2 and 4). Differentially sensing the column electrodes can remove common mode noise from the touch measurements, and spacing the rows measured by the differential amplifiers can be used to accept locally common mode signals (e.g., from a stylus or other input device).

Although applying complimentary signals is shown for FIG. 6B for adjacent electrodes for each column (e.g., the complementary signals D0/D0' are applied to column 1, the complementary signals D1/D1' are applied to column 2, etc.), it is understood that the complimentary signal can be applied to different column electrodes over a larger localized region the touch sensor panel (e.g., across diagonal touch nodes) to further increase the sensed signal in response to a touching object.

FIGS. 6A-6B should be understood to represent some examples of routing between the electrodes (rows in this example) and the differential amplifiers. In FIG. 6A, each touch node is a specific row is routed to the same differential amplifier via its two input terminals, with spatial alternating for touch nodes routed between the two input terminals. In FIG. 6B, half of the touch nodes in each row are routed to one input terminal of a first differential amplifier and the other half of the touch in the row are routed to one input terminal of a second differential amplifier, with a spatially pattern with respect to the routing of the touch nodes to the differential amplifier inputs. In other examples, other routing between the electrodes and differential amplifiers can be used. For examples, electrodes routed to a particular differential amplifier from a spatially alternating pattern of rows or columns, noncontiguous touch nodes along a row or column, non-rectilinear arrangements, diagonal arrangements (e.g., as shown in FIG. 8), and the like.

In general, the interleaving of the drive electrodes with the sense electrodes in a pattern and the differential and orthogonal driving of the drive electrodes can result in patterning of the amount of mutual capacitance coupling (electrostatic fringe field coupling) between the drive electrodes and the sense electrodes. For example, for a respective first sense electrode, the amount of the electrostatic fringe field coupling to a first group of drive electrodes can be relatively large (greater than a first threshold) forming dominant capacitances and the amount of the electrostatic field coupling to a second group of the drive electrodes can be relatively small (less than a second threshold) forming minor capacitances. For a respective second sense electrode, the amount of the electrostatic fringe field coupling to the second group of drive electrodes can be relatively large (greater than a first threshold) forming dominant capacitances and the amount of the electrostatic field coupling to the first group of the drive electrodes can be relatively small (less than a second threshold) forming minor capacitances. The dominant capacitances and the minor capacitances can be spatially patterned according to the pattern of the drive and sense electrodes.

FIG. 6C illustrates a touch sensor panel 620 similar to touch sensor panel 600, the details of which are not repeated here for brevity. Touch sensor panel 620 includes row electrodes 622A-622H and column electrodes 624A-624H corresponding to row electrodes 602A-602H and column electrodes 604A-604H, respectively. However, the conductive segments of row electrodes 622A-622H and column electrodes 624A-624H can have a different shape than the electrodes illustrated in FIG. 6A. In particular, rather than one conductive segment per electrode and per node (e.g., interlocking rectangle and U-shaped conductive segments), multiple conductive segments (e.g., interlocking L-shaped conductive segments) for each electrode can be distributed within the touch node. The distribution of the conductive segments within the touch node can improve the touch signal levels (and therefore the SNR for touch sensing) because mutual capacitance in a single-layer touch sensor panel can be a function of the distance between the conductive material of the electrodes that are driven and sensed. For example, the mutual capacitances can be greater along the boundaries between a conductive segment of an electrode that is driven and a conductive segment of an electrode that is sensed as compared with the center of the two conductive segments. Thus, by distributing the conductive segments within the touch node area (thereby reducing the maximum spacing between a region of the drive electrode and a region of a sense electrode in the touch node), the signal measured at the touch node can be increased (e.g., relative to other touch electrode patterns, such as those shown in FIGS. 6A-6B). The increase in mutual capacitance can provide increased modulation between finger and the sensor (e.g., for increased signal). Additionally, the distribution of the conductive segments can provide improve linearity of the touch signal detected as an object moves across the touch sensor panel (e.g., more uniform signal measured by an object, independent on the location of the object on the touch sensor panel). Improved linearity can provide various benefits of improved touch performance that include more precise and accurate touch location detection, reduced wobble, etc.

As illustrated in FIG. 6C, the drive circuitry can include four differential drivers 626A-626D. Each column of touch nodes illustrated can have its two column electrodes driven by the complimentary drive signal outputs of a respective one of the differential drivers. The sense circuitry can include four differential amplifier 628A-628D (e.g., including common mode feedback circuits). Each row of touch nodes illustrated can have its two row electrodes be sensed by a respective of the differential amplifiers.

Figure 7A:
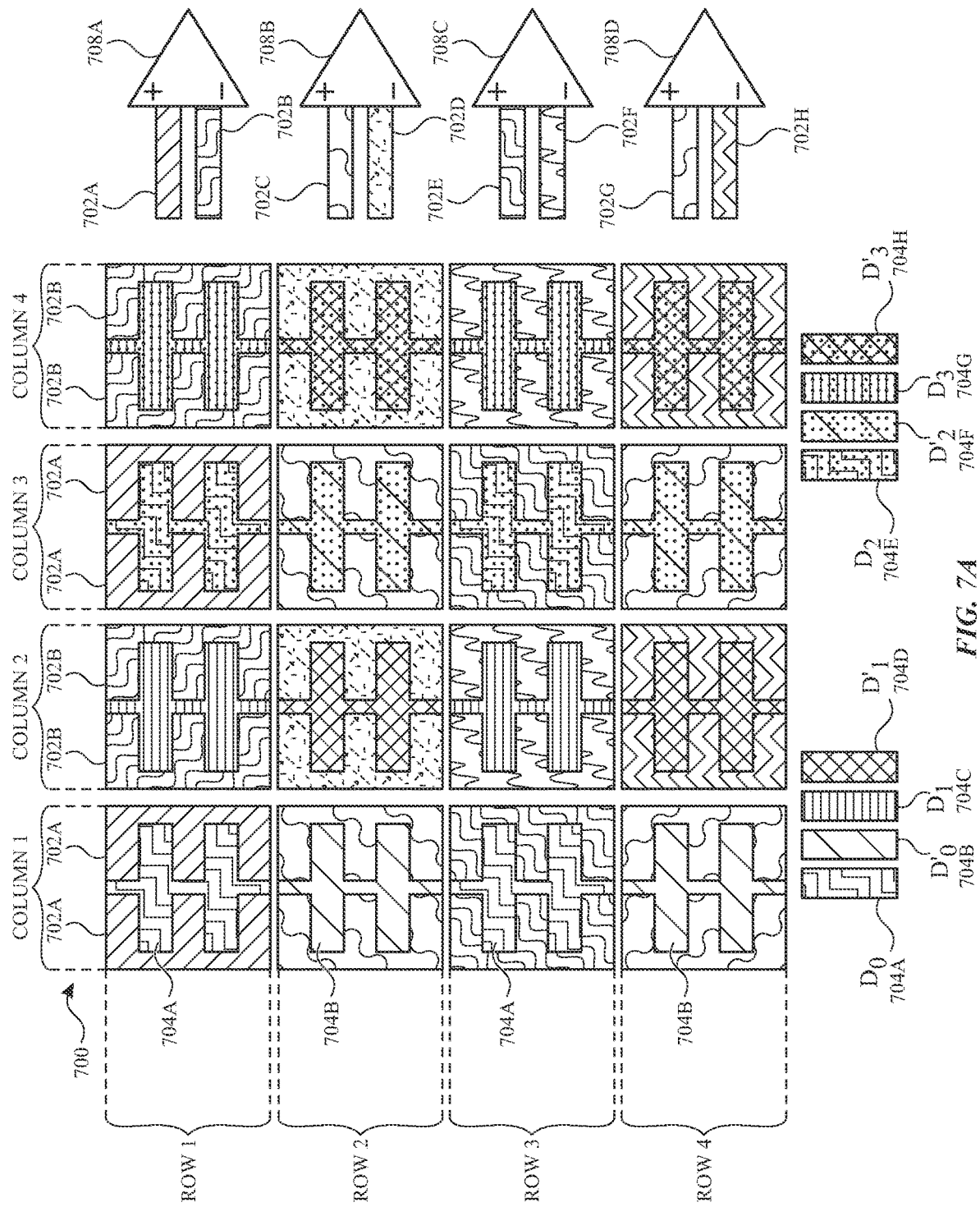
FIGS. 7A-7B illustrate touch sensor panels implementing differential driving and differential sensing according to examples of the disclosure.
Figure 7B:
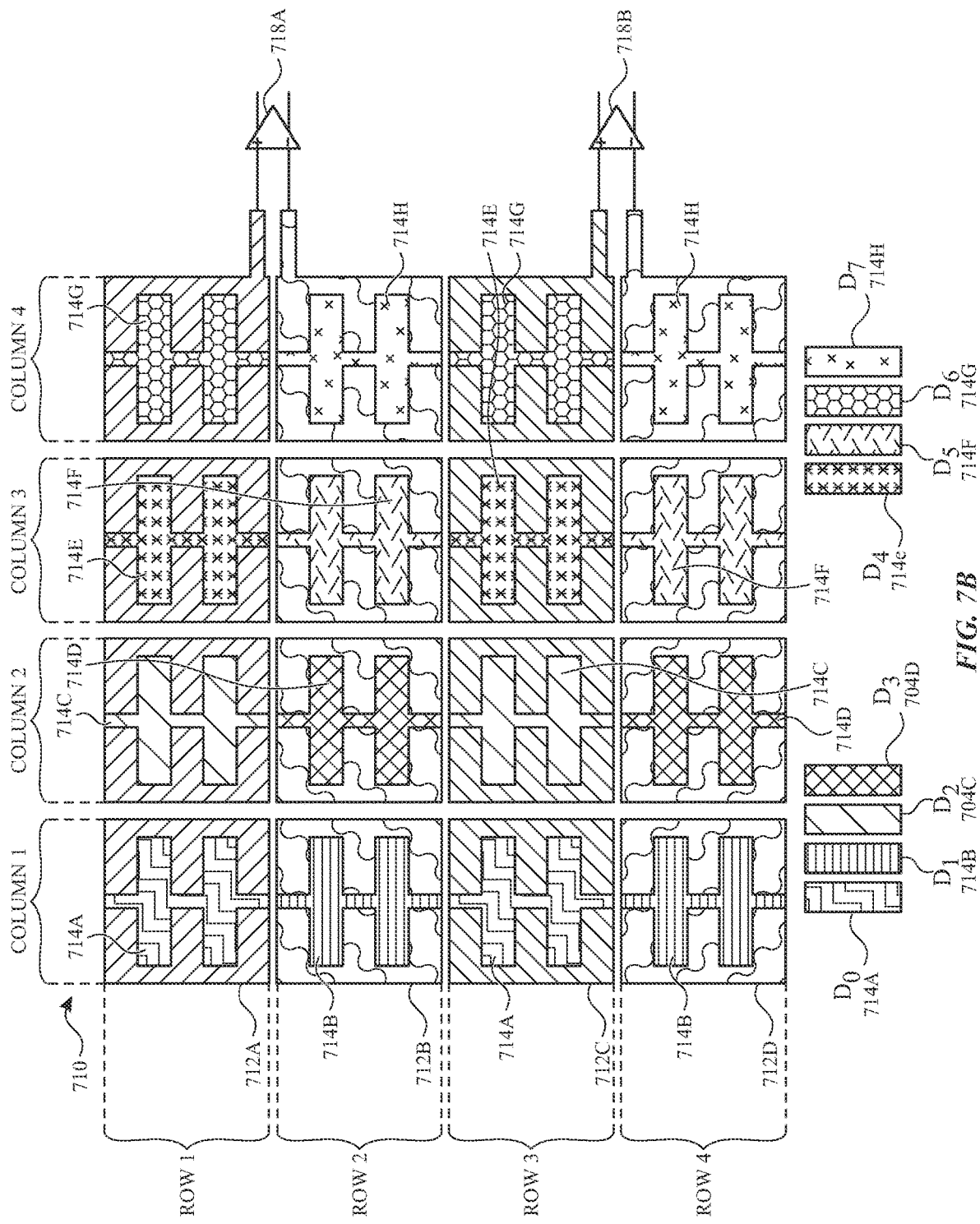
Figure 8:
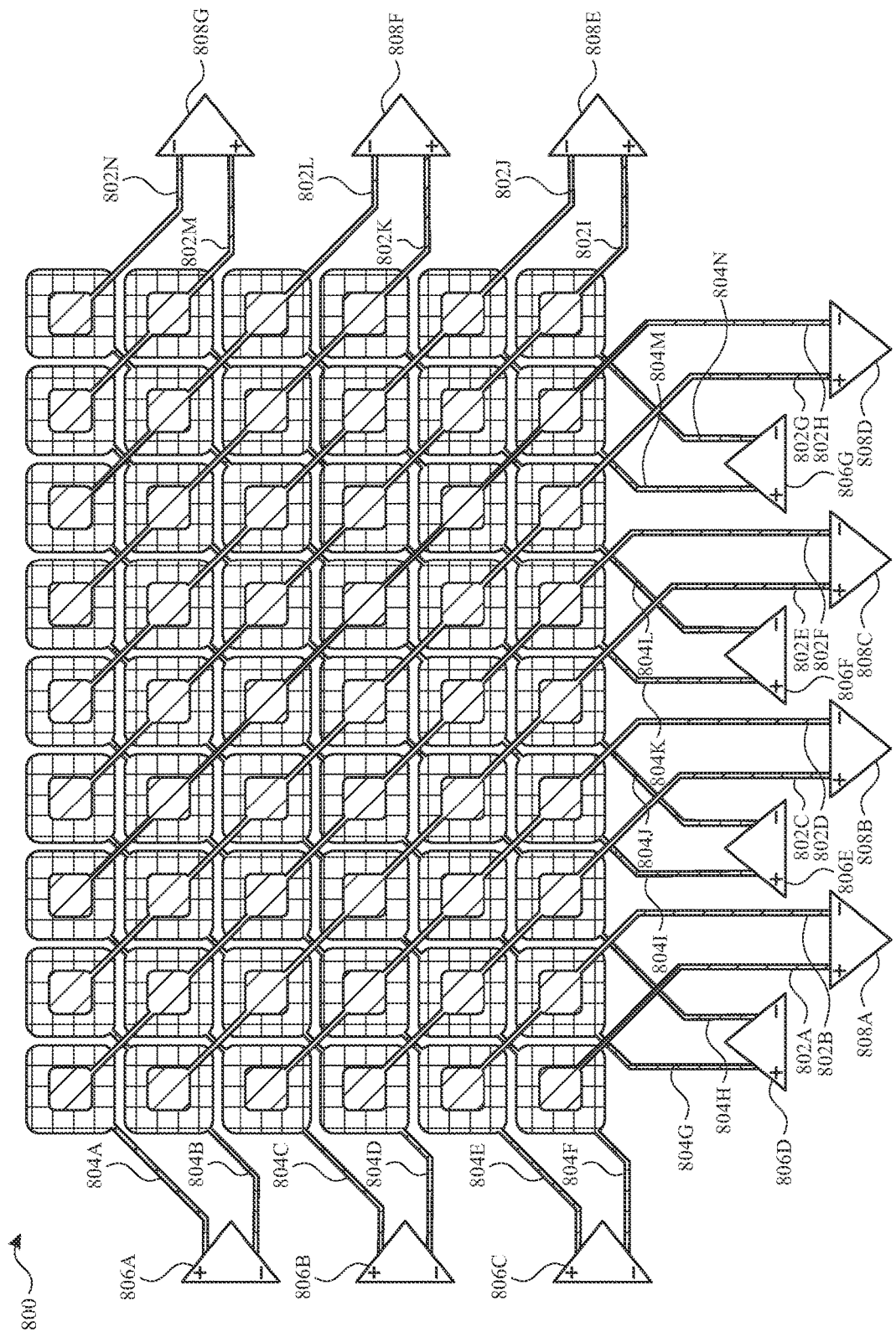
FIG. 8 illustrates a touch sensor panel with a non-rectilinear arrangement according to examples of the disclosure.

FIGS. 7A-7B illustrate touch sensor panels implementing differential driving and/or differential sensing according to examples of the disclosure. FIG. 7 illustrates a touch sensor panel 700 implementing differential driving and differential sensing according to examples of the disclosure. Touch sensor panel 700 illustrates a 4×4 array of sixteen capacitance values similar to the touch sensor panels of FIGS. 6A-6C, but with a different arrangement of touch electrodes (e.g., with different shapes). For ease of illustration, touch sensor panel 700 illustrates the conductive segments forming the touch nodes of touch sensor panel 700 without illustrating the routing. In some examples, touch sensor panel 700 can have mutual capacitance/electrostatic fringe field coupling with a spatial pattern, in a manner similar to described above with respect to FIG. 5B, due to routing. Each of the touch nodes illustrated in FIG. 7A includes a conductive segment shaped like a two-barred cross and two conductive segments shaped like the letter E (mirrored and interlocked with the conductive segment shaped like the two-barred cross). For each row, conductive segments shaped like the letter E can be coupled by routing. For example, in a first row ("row 1"), row electrode 702A can include four conductive segments shaped like the letter E and row electrode 702B can include four conductive segments shaped like the letter E. Likewise, row electrodes 702C-702H of the remaining rows can each include four conductive segments shaped like the letter E. Each column of touch nodes in touch sensor panel 700 can include four conductive segments having the two-barred cross shape, with alternate conductive segments coupled together via routing (and/or driven with the same drive signal) and forming a column electrode. For example, the first column of touch sensor panel 700 can include two conductive segments (two-barred cross shape) together forming column electrode 704A and can include two conductive segments (two-barred cross shape) together forming column electrode 704B. Likewise, column electrodes 704C-704H can each include two two-barred cross shaped electrodes in alternating rows.

Touch sensor panel 700 can stimulate column electrodes 704A-704H with a multi-stimulus pattern of drive signals. For example, a multi-stimulus patterns of drive signals (D0-D3) and its compliment (D0'-D3') can be concurrently applied to column electrodes 704A-704H (e.g., by drive circuitry, not shown, but represented by drive signals D0-D3 and D0'-D3'). As an example of differentially driving the sensor depicted in FIG. 7A, column 1 can be driven by drive signal D0 and its compliment D0' (e.g., the negative of drive signal D0), column 2 can be driven by drive signal D1 and its compliment D1' (e.g., the negative of drive signal D1), column 3 can be driven by drive signal D2 and its compliment D2' (e.g., the negative of drive signal D2), and column 4 can be driven by drive signal D3 and its compliment D3' (e.g., the negative of drive signal D3). For example, column electrode 704A can be driven with drive signal D0 and column electrode 704B can be driven with its compliment D0', column electrode 704C can be driven with drive signal D1 and column electrode 704D can be driven with its compliment D1', column electrode 704E can be driven with drive signal D2 and column electrode 704F can be driven with its compliment D2', and column electrode 704G can be driven with drive signal D3 and column electrode 704H can be driven with its compliment D3'.

In the above differential driving scheme, each drive signal and its compliment are applied to the column electrodes in a respective column (e.g., for a net zero voltage for the column). In some examples, each drive signal and its compliment may not be applied within the same column (e.g., resulting in a net zero voltage for the touch sensor panel without necessarily a net zero voltage for each column). For example, differentially driving the sensor can include driving column electrodes 704A-704D with drive signals D0-D3, respectively, and driving electrodes 704E-704H with complimentary drive signals D0'-D3', respectively.

Row electrodes 702A-702H can be differentially sensed using differential amplifiers 708A-708D (e.g., including common mode feedback circuits). For example, row electrodes 702A-702B can be differentially sensed using differential amplifier 708A, row electrodes 702C-702D can be differentially sensed using differential amplifier 708B, row electrodes 702E-702F can be differentially sensed using differential amplifier 708C, and row electrodes 702G-702H can be differentially sensed using differential amplifier 708D. Differentially sensing the column electrodes can remove common mode noise from the touch measurements.

It should be understood that although touch sensor panel 700 includes a 4×4 array of sixteen capacitance values (e.g., corresponding to sixteen touch nodes), that the touch sensor panel can be scaled up or down to include fewer or more touch nodes. Additionally, in some examples, sensing can be differential over alternating rows (e.g. differentially sensing some row electrodes of row 1 with some row electrodes of a different row, as described, for example, with reference to FIG. 6B).

FIG. 7B illustrates a touch sensor panel 710 implementing differential driving and/or differential sensing according to examples of the disclosure. The configuration of FIG. 7B relies on fewer differential amplifiers as compared with the configurations of FIGS. 6A-6C and 7A (e.g., two differential amplifiers rather than four differential amplifiers).

Touch sensor panel 710 illustrates a 4×4 array of sixteen capacitance values. For ease of illustration, touch sensor panel 710 illustrates the conductive segments forming the touch nodes of touch sensor panel 710 without illustrating most of the routing. In some examples, touch sensor panel 710 can have mutual capacitance/electrostatic fringe field coupling with a spatial pattern, in a manner similar to described above with respect to FIG. 5B, due to routing. Each of the touch nodes illustrated in FIG. 7B includes a conductive segment shaped like a two-barred cross and two conductive segments shaped like the letter E (mirrored and interlocked with the conductive segment shaped like the two-barred cross). For each row electrode, the conductive segments shaped like the letter E can be coupled by routing. For example, row electrode 712A can include eight conductive segments shaped like the letter E. Likewise, row electrodes 712D-712D can each include eight conductive segments shaped like the letter E. Each column of touch nodes in touch sensor panel 710 can include four conductive segments having the two-barred cross shape, with alternate conductive segments coupled together via routing (and/or driven with the same drive signal) and forming a column electrode. For example, the first column of touch sensor panel 710 can include two conductive segments (two-barred cross shape) together forming column electrode 714A and can include two conductive segments (two-barred cross shape) together forming column electrode 714B. Likewise, column electrodes 714C-714H can each include two two-barred cross shaped electrodes in alternating rows. The configuration of FIG. 7B includes a similar arrangement of touch electrodes including column electrodes 714A-714H (formed of conductive segment shaped like a two-barred cross) and row electrodes 712A-712D (formed of conductive segments shaped like the letter E).

Touch sensor panel 710 stimulates column electrodes 704A-704H with a multi-stimulus pattern of drive signals. For example, a multi-stimulus patterns of drive signals (D0-D7), such as an 8×8 Hadamard, can be concurrently applied to column electrodes 704A-704H (e.g., by drive circuitry, not shown, but represented by drive signals D0-D7). In some examples, the drive signals D0-D7 can be differentially driven (e.g., drive signals D0-D7 can correspond to drive signals D0-D3 and D0'-D3' of FIG. 7A), but with a reduced information about the capacitances at each node. In some examples, the drive signals D0-D7 can be at least partially differentially driven (e.g., D0 and D1 may be complimentary for some or all of the steps of the multi-stimulus patterns, D2 and D3 may be complimentary for some or all of the steps of the multi-stimulus patterns, D4 and D5 may be complimentary for some or all of the steps of the multi-stimulus patterns, and/or D6 and D7 may be complimentary for some or all of the steps of the multi-stimulus patterns).

Row electrodes 712A-712D can be differentially sensed using differential amplifiers 718A-718B (e.g., including common mode feedback circuits). For example, row electrodes 712A-712B can be differentially sensed using differential amplifiers 718A and row electrodes 712C-712D can be differentially sensed using differential amplifier 718B. Differentially sensing the column electrodes can remove common mode noise from the touch measurements.

It should be understood that although touch sensor panel 710 includes a 4×4 array of sixteen capacitance values (e.g., corresponding to sixteen touch nodes), that the touch sensor panel can be scaled up or down to include fewer or more touch nodes. Additionally, in some examples, sensing can be differential over alternating rows (e.g. sensing rows 1 and 3 differentially, and second rows 2 and 4 differentially, as described with reference to FIG. 6B).

FIGS. 5A-7B illustrate touch sensor panels with rectilinear arrangements of row and column electrode wiring. Touch sensor panels according to examples of the disclosure are not so limited. In some examples, a non-rectilinear arrangement can be used, in which the touch nodes can be arranged in a row and column array, but the routing can be diagonal (e.g., on a different axis than the row-column array of touch nodes). FIG. 8 illustrates a touch sensor panel 800 with a non-rectilinear arrangement according to examples of the disclosure. Specifically, touch sensor panel 800 can include first electrodes 802A-802N arranged on a first diagonal (upper left to lower right) and second electrodes 804A-804N arranged on diagonals (upper right to lower left). The first and second electrodes can have a square inside a square electrode pattern, with the first electrodes 802A-802N being formed of inner square segments connected by routing and/or bridges and the second electrodes 804A-804N being formed of outer (hollow) square segments connected by routing and/or bridges. In some examples, pairs of first electrodes 802A-802N can be differentially sensed by differential amplifiers 808A-808G (including common mode feedback circuits, not shown) as described herein (and not repeated again for brevity), and pairs of second electrodes 804A-804N can be differentially driven by differential drivers 806A-806G as described herein (and not repeated again for brevity).

The non-rectilinear arrangement can reduce the total number of transmitter and receiver circuits compared with a non-rectilinear arrangement. For example, the 6×9 array of touch nodes of FIG. 8 use seven differential transmitters and seven differential receiver, whereas a row-column arrangement may use six differential transmitters and nine differential receivers. Additionally, the non-rectilinear arrangement can reduce the number of routing traces (as there can be a smaller total number of differential transmitter and receiver circuits). Reducing the number of routing traces may allow for shrinking of the border region or provide space for wider routing traces. Additionally, the non-rectilinear arrangement can reduce the number of jumpers for the routing traces. For example, for the non-rectilinear arrangement of FIG. 8, there can be one jumper at the meeting point between four touch nodes (e.g., intersection of two diagonals), whereas for a row-column arrangement more jumpers may be required because there can be more intersections of the routing traces between rows and columns (e.g., each column and each row of can include a pair of routing traces that intersect). Although FIG. 8 illustrates a two-axis array of touch nodes (e.g., a row-column array) formed from square shaped electrodes with diagonal routing that can be at an angle of 45° with respect to the rectilinear row-column array, it should be understood that this is an example of non-rectilinear routing. In some examples, the diagonal routing can be routing that is at an angle with respect to the axis of the two-axis array of touch nodes such that the routing connections form connections along the diagonal for touch nodes in the two-axis array of touch nodes.

In some examples, the stimulation for each of the transmitters can use a unique code and the codes can be optimized to reduce the amount of injected charge in the touch sensor panel due to touch sensor operation. For example, display data lines may run parallel to (e.g., below) the column of touch nodes and the codes for the transmitters can be selected to reduce the amount of net injected charge along a column of electrodes to reduce interference between the display and touch systems.

In some examples, to improve performance of the non-rectilinear arrangement, the number of transmitters and receivers can be increased. For example, FIG. 8 illustrates each diagonal of the touch sensor panel including a routing trace for one terminal of a differential transmitter or one terminal of a differential receiver. For example, each outer square segment along a diagonal is coupled to one terminal of a differential transmitter and each inner square segment is coupled to one terminal of a differential receiver. In some examples, the number of transmitters and receivers and the number of routing traces can be doubled, such that outer square segments along a diagonal can be coupled in an alternating pattern to the positive or negative terminal of a differential transmitter and such that inner square segments along a diagonal can be coupled in an alternating pattern to the positive or negative terminal of a differential receiver. Doubling the number of transmitters and receivers can improve the spatial resolution of the noise cancelation due to inversion by a factor of $\sqrt{2}$.

Although FIG. 8 shows non-rectilinear arrangement for the routing traces for both transmitters and receivers, it should be understood that in some examples, the non-rectilinear arrangement can be used for transmitters and a rectilinear arrangement can be used for receivers. For example, the transmitters 806A-806G can be coupled using non-rectilinear arrangement of routing traces for the outer square segments as shown in FIG. 8, but the receivers can be coupled using a rectilinear arrangement. In such a configuration, nine differential receivers can be used, and inner square segments within a column can be connected in an alternating pattern such that half of the inner square segments can be coupled to the inverting terminal of a differential receiver and the other half of the inner square segments can be coupled to the non-inverting terminal of the differential receiver. It should be understood that in an alternative configuration, the non-rectilinear arrangement can be used for receivers and a rectilinear arrangement can be used for transmitters.

Figure 9:
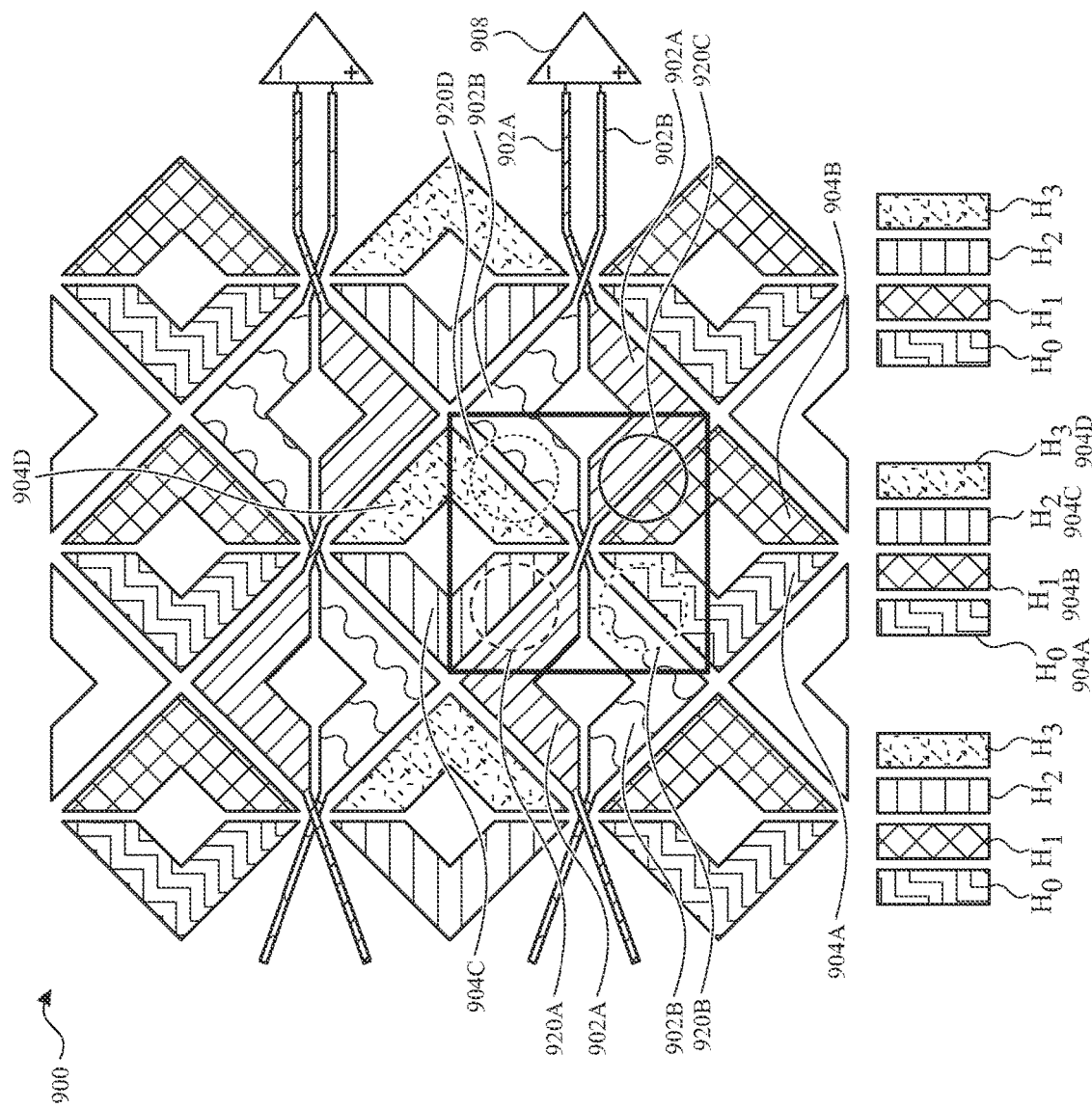
FIG. 9 illustrates a touch sensor panel implementing differential driving and differential sensing according to examples of the disclosure.

FIG. 9 illustrates a touch sensor panel 900 implementing differential driving and differential sensing according to examples of the disclosure. Touch sensor panel 900 illustrates a portion of a touch sensor panel with a different arrangement of touch electrodes having a split diamond geometry (e.g., a triangular electrode or a V-shaped electrode for a hollow-centered diamond). For ease of illustration, touch sensor panel 900 illustrates the conductive segments of touch sensor panel 900 without illustrating all of the routing. The conductive segments are arranged in a split diamond pattern with "row diamonds" forming interleaved first electrodes splitting the diamond on a horizontal and "column diamonds" forming interleaved second electrodes splitting the diamond on a vertical. For example, a first electrode 902A is formed from a top half-diamond conductive segment (or V-shaped electrode) and a bottom half-diamond conductive segment (or V-shaped electrode), and is routed to a first input (e.g., inverting input) of differential amplifier 908. Although first electrode 902A is shown including only two half-diamond conductive segments, it is understood that additional half-diamond segments may be included for a larger touch sensor panel (e.g., with first electrode 902A alternating between top and bottom half-diamond shaped electrodes). In a similar manner, a first electrode 902B is formed from a bottom half-diamond conductive segment and a top half-diamond conductive segment, and is routed to a second input (e.g., non-inverting input) of differential amplifier 908. Although first electrode 902B is shown including only two half-diamond conductive segments, it is understood that additional half-diamond segments may be included for a larger touch sensor panel (e.g., with first electrode 902B alternating between bottom and top half-diamond shaped electrodes). For ease of description, interleaved first electrodes 902A-902B are described, but it is understood that additional differential amplifiers can be coupled to additional first electrodes in a similar arrangement.

Second electrodes 904A-904D are formed from left half-diamond conductive segments or right-half-diamond conductive segments. For example, FIG. 9 illustrates second electrode 904A is formed from two left half-diamond conductive segments with a left half-diamond conductive segment of second electrode 904C between the two left half-diamond conductive segments of second electrode 904A. Although second electrode 904A is shown including two half-diamond conductive segments and 904C is shown including one half-diamond segment, it is understood that additional half-diamond segments may be included for a larger touch sensor panel (e.g., with half-diamond conductive segments of second electrodes 904A and 904C alternating along the column). In a similar manner, second electrodes 904B is formed from two right half-diamond conductive segments with a right half-diamond conductive segment of second electrode 904D between the two right half-diamond conductive segments of second electrode 904B. Although second electrode 904B is shown including two half-diamond conductive segments and 904D is shown including one half-diamond segment, it is understood that additional half-diamond segments may be included for a larger touch sensor panel (e.g., with half-diamond conductive segments of second electrodes 904B and 904D alternating). Second electrodes 904A-904D can be coupled to drive signals H0-H3. For ease of description, second electrodes 904A-904D are described, but it is understood that additional columns of second electrodes can be added in a similar arrangement.

Touch sensor panel 900 can stimulate second electrodes 904A-904D with a multi-stimulus pattern of drive signals. For example, a multi-stimulus patterns of drive signals (H0-H3) can be concurrently applied to second electrodes 904A-904D (e.g., by drive circuitry, not shown, but represented by drive signals H0-H3). As an example of differentially driving the sensor depicted in FIG. 9, second electrode 904A can be driven by drive signal H0 and second electrode 904B can be driven by drive signal H1, where H1 is a compliment of H0 (e.g., the negative of drive signal H0). In a similar manner, second electrode 90CA can be driven by drive signal H2 and second electrode 904D can be driven by drive signal H3, where H3 is a compliment of H2 (e.g., the negative of drive signal H2). Additional orthogonal sets of multi-stimulus patterns of drive signals can be applied to additional "columns" of second electrodes. In the above differential driving scheme, each drive signal and its compliment are applied to the second electrodes in a respective column (e.g., for a net zero voltage for the column). In some examples, each drive signal and its compliment may not be applied within the same column (e.g., resulting in a net zero voltage for the touch sensor panel without necessarily a net zero voltage for each column).

First electrodes can be differentially sensed using differential amplifiers (e.g., including common mode feedback circuits). For example, first electrodes 902A-902B can be differentially sensed using differential amplifier 908. As shown in FIG. 9, for one "column" and one "row" of diamonds, differential amplifier can measure four capacitive coupling signals between second electrodes 904A-904D and first electrodes 902A-902B. The four capacitive coupling signals can include a first capacitive coupling 920A between first electrode 902A and second electrode 904C, a second capacitive coupling 920B between first electrode 902B and second electrode 904A, a third capacitive coupling 920C between first electrode 902A and second electrode 904B, and a fourth capacitive coupling 920D between first electrode 902B and second electrode 904D. The differential amplifier can measure the first and third capacitive couplings 920A and 920C differentially with the fourth and second capacitive couplings 920B and 902D for a representation of the capacitance in the region shown by the box in FIG. 9 (e.g., in the designated spatial pattern of coupling). Differentially sensing the column electrodes can remove common mode noise from the touch measurements.

It should be understood that touch sensor panel 900 can be scaled up or scaled down to form a larger or smaller touch sensor panel arrays (and to measure more or fewer capacitance values). Additionally, in some examples, sensing can be differential over alternating rows (e.g. differentially sensing a first electrodes of a first row with a first electrode of a second row, as described, for example, with reference to FIG. 6B).

Therefore, according to the above, some examples of the disclosure are directed to a touch-sensitive surface (or a touch sensor panel or touch screen). The touch-sensitive surface can comprise: a plurality of touch electrodes including a plurality of first touch electrodes and a plurality of second touch electrodes, the plurality of touch electrodes forming a two-dimensional array of touch nodes including a first column of touch nodes and a second column of touch nodes; drive circuitry coupled to the plurality of first touch electrodes; and sense circuitry coupled to the plurality of second touch electrodes. The drive circuitry can be configured to drive the plurality of first touch electrodes with a plurality of drive signals and the sense circuitry can be configured to differentially sense the plurality of second touch electrodes (e.g., differentially). For the first column of touch nodes, the plurality of drive signals can include a first drive signal applied to one or more first touch nodes of the first column of touch nodes and a second drive signal applied to a one or more second touch nodes of the first column of touch nodes. The first drive signal and the second drive signal can be applied at least partially concurrently. Additionally or alternatively to the examples disclosed above, in some examples, for the second column of touch nodes, the plurality of drive signals can include a third drive signal applied to one or more first touch nodes of the second column of touch nodes and a fourth drive signal applied to a one or more second touch nodes of the second column of touch nodes. The first drive signal, the second drive signal, the third drive signal, and the fourth drive signal are applied at least partially concurrently. Additionally or alternatively to the examples disclosed above, in some examples, for the second column of touch nodes, the plurality of drive signals can include a third drive signal applied to one or more first touch nodes of the second column of touch nodes. The third signal can be an inverse of the first drive signal or the second drive signal (e.g., a complimentary signal 180 out of phase). Additionally or alternatively to the examples disclosed above, in some examples, the first column of touch nodes and the second column of touch nodes can be adjacent columns in the two-dimensional array of touch nodes. Additionally or alternatively to the examples disclosed above, in some examples, a 4×4 portion of the two-dimensional array of touch nodes can comprise eight touch electrodes of the plurality of first touch electrodes and eight touch electrodes of the plurality of second touch electrodes. Additionally or alternatively to the examples disclosed above, in some examples, the drive circuitry can comprise: four transmitters coupled to four of the eight touch electrodes of the plurality of first touch electrodes; and four inverters coupled between the four transmitters and another four of the eight touch electrodes of the plurality of first touch electrodes. Additionally or alternatively to the examples disclosed above, in some examples, the sense circuitry can comprise: four differential amplifiers. Inverting inputs of the four differential amplifiers can be coupled to four of the eight touch electrodes of the plurality of second touch electrodes, and non-inverting inputs of the four differential amplifiers can be coupled to another four of the eight touch electrodes of the plurality of second touch electrodes. Additionally or alternatively to the examples disclosed above, in some examples, a 4×4 portion of the two-dimensional array of touch nodes can comprise eight touch electrodes of the plurality of first touch electrodes and four touch electrodes of the plurality of second touch electrodes. Additionally or alternatively to the examples disclosed above, in some examples, the drive circuitry can comprise eight transmitters coupled to the eight touch electrodes of the plurality of first touch electrodes and the sense circuitry can comprise two differential amplifiers. Inverting inputs of the two differential amplifiers can be coupled to two of the four touch electrodes of the plurality of second touch electrodes, and non-inverting inputs of the two differential amplifiers can be coupled to another two of the four touch electrodes of the plurality of second touch electrodes. Additionally or alternatively to the examples disclosed above, in some examples, the plurality of first touch electrodes and the plurality of second touch electrodes can be formed in a common layer.

Some examples of the disclosure are directed to a portable consumer electronic device. The portable consumer electronic device can comprise: an energy storage device (e.g., a battery); communication circuitry (e.g., wireless); and a touch screen. The touch screen can include: a display; a plurality of touch electrodes (e.g., disposed over the display) including a plurality of first touch electrodes and a plurality of second touch electrodes, the plurality of touch electrodes forming a two-dimensional array of touch nodes including a first column of touch nodes and a second column of touch nodes; drive circuitry coupled to the plurality of first touch electrodes and sense circuitry coupled to the plurality of second touch electrodes. The drive circuitry can be configured to drive the plurality of first touch electrodes with a plurality of drive signals. For the first column of touch nodes, the plurality of drive signals can include a first drive signal applied to one or more first touch nodes of the first column of touch nodes and a second drive signal applied to a one or more second touch nodes of the first column of touch nodes. The first drive signal and the second drive signal can be applied at least partially concurrently. The sense circuitry can be configured to differentially sense the plurality of touch electrodes. Additionally or alternatively to the examples disclosed above, in some examples, for the second column of touch nodes, the plurality of drive signals can include a third drive signal applied to one or more first touch nodes of the second column of touch nodes and a fourth drive signal applied to a one or more second touch nodes of the second column of touch nodes. The first drive signal, the second drive signal, the third drive signal, and the fourth drive signal are applied at least partially concurrently. Additionally or alternatively to the examples disclosed above, in some examples, for the second column of touch nodes, the plurality of drive signals can include a third drive signal applied to one or more first touch nodes of the second column of touch nodes. The third signal can be an inverse of the first drive signal or the second drive signal (e.g., a complimentary signal 180 out of phase). Additionally or alternatively to the examples disclosed above, in some examples, the first column of touch nodes and the second column of touch nodes can be adjacent columns in the two-dimensional array of touch nodes. Additionally or alternatively to the examples disclosed above, in some examples, a 4×4 portion of the two-dimensional array of touch nodes can comprise eight touch electrodes of the plurality of first touch electrodes and eight touch electrodes of the plurality of second touch electrodes. Additionally or alternatively to the examples disclosed above, in some examples, the drive circuitry can comprise: four transmitters coupled to four of the eight touch electrodes of the plurality of first touch electrodes; and four inverters coupled between the four transmitters and another four of the eight touch electrodes of the plurality of first touch electrodes. Additionally or alternatively to the examples disclosed above, in some examples, the sense circuitry can comprise: four differential amplifiers. Inverting inputs of the four differential amplifiers can be coupled to four of the eight touch electrodes of the plurality of second touch electrodes, and non-inverting inputs of the four differential amplifiers can be coupled to another four of the eight touch electrodes of the plurality of second touch electrodes. Additionally or alternatively to the examples disclosed above, in some examples, a 4×4 portion of the two-dimensional array of touch nodes can comprise eight touch electrodes of the plurality of first touch electrodes and four touch electrodes of the plurality of second touch electrodes. Additionally or alternatively to the examples disclosed above, in some examples, the drive circuitry can comprise eight transmitters coupled to the eight touch electrodes of the plurality of first touch electrodes and the sense circuitry can comprise two differential amplifiers. Inverting inputs of the two differential amplifiers can be coupled to two of the four touch electrodes of the plurality of second touch electrodes, and non-inverting inputs of the two differential amplifiers can be coupled to another two of the four touch electrodes of the plurality of second touch electrodes. Additionally or alternatively to the examples disclosed above, in some examples, the plurality of first touch electrodes and the plurality of second touch electrodes can be formed in a common layer.

Some examples of the disclosure are directed to a touch sensor panel. The touch sensor panel can comprise: a plurality of touch electrodes including a plurality of first touch electrodes and a plurality of second touch electrodes, the plurality of touch electrodes forming a two-dimensional array of touch nodes including a plurality of columns of touch nodes and a plurality of rows of touch nodes; and a plurality of routing traces including a first routing trace and a second routing trace. A first row of the plurality of rows of touch nodes can include a first group of row touch nodes coupled to touch sensing circuitry via the first routing trace and a second group of row touch nodes coupled to the touch sensing circuitry via the second routing trace. Additionally or alternatively to the examples disclosed above, in some examples, the plurality of routing traces can include a third routing trace and a fourth routing trace. A first column of the plurality of columns of touch nodes can include a first group of column touch nodes coupled to the touch sensing circuitry via the third routing trace and a second group of column touch nodes coupled to the touch sensing circuitry via the fourth routing trace.

Some examples of the disclosure are directed to a touch-sensitive surface. The touch-sensitive surface comprises a plurality of touch electrodes including a plurality of first touch electrodes and a plurality of second touch electrodes, the plurality of touch electrodes forming an array of touch nodes including a first set of touch nodes in a first pattern and a second set of touch nodes in a second pattern. The touch-sensitive surface also comprises drive circuitry coupled to the plurality of first touch electrodes and configured to drive the plurality of first touch electrodes with a plurality of drive signals, wherein for the first set of touch nodes, the plurality of drive signals includes a first drive signal applied to one or more first touch nodes of the first set of touch nodes and a second drive signal applied to one or more second touch nodes of the second set of touch nodes, wherein the first drive signal and the second drive signal are applied at least partially concurrently. The touch-sensitive surface also comprises sense circuitry coupled to the plurality of second touch electrodes and configured to differentially sense the plurality of second touch electrodes. Additionally or alternatively to one or more of the examples disclosed above, in some examples the first set of touch nodes in the first pattern and the second set of touch nodes in the second pattern are arranged with a first orientation.

Some examples of the disclosure are directed to a mutual capacitance touch sensor panel. The mutual capacitance touch sensor panel comprises a plurality of touch electrodes including a plurality of transmitter electrodes and a plurality of receiver electrodes interleaved with the plurality of transmitter electrodes, the plurality of touch electrodes interconnected into groups forming a two-axis array of touch nodes. In some examples, the plurality of transmitter electrodes are configured for being driven with a plurality of stimulation signals such that an electrostatic fringe field coupling of the plurality of transmitter electrodes is substantially alternating high and low with successive groups of receiver electrodes in a repeating pattern.

Some examples of the disclosure are directed to a touch-sensitive surface. The touch-sensitive surface comprises a plurality of touch electrodes including a plurality of first touch electrodes configured as transmitter electrodes and a plurality of second touch electrodes configured as receiver electrodes, the plurality of touch electrodes forming an array of touch nodes including a first set of touch nodes in a first pattern and a second set of touch nodes in a second pattern. The touch-sensitive surface also comprises drive circuitry coupled to the plurality of first touch electrodes and configured to drive the plurality of first touch electrodes with a plurality of drive signals, wherein for the first set of touch nodes, the plurality of drive signals includes a first drive signal applied to one or more first touch nodes of the first set of touch nodes and a second drive signal applied to one or more second touch nodes of the second set of touch nodes, wherein the first drive signal and the second drive signal are applied at least partially concurrently. In some examples, the capacitive coupling between a set of receiver electrodes and successive sets of transmitter electrodes is substantially spatially alternating.

Some examples of the disclosure are directed to a mutual capacitance touch sensor panel. The touch sensor panel can comprise a plurality of touch electrodes including a plurality of transmitter electrodes and a plurality of receiver electrodes interleaved with the plurality of transmitter electrodes, the plurality of touch electrodes interconnected into groups forming a two-axis array of touch nodes. The plurality of transmitter electrodes can be configured for being driven with a plurality of stimulation signals such that an electrostatic fringe field coupling of the plurality of transmitter electrodes can be substantially alternating high and low with successive groups of receiver electrodes in a repeating pattern. Additionally or alternatively to the examples disclosed above, in some examples, the touch sensor panel can further comprise: drive circuitry coupled to the plurality of transmitter electrodes and configured to drive the plurality of transmitter electrodes with a plurality of drive signals, and sense circuitry coupled to the plurality of receiver electrodes and configured to differentially sense the plurality of receiver electrodes. Additionally or alternatively to the examples disclosed above, in some examples, for a first column of touch nodes in the two-axis array of touch nodes, the plurality of drive signals can include a first drive signal applied to one or more first touch nodes of the first column of touch nodes and a second drive signal applied to one or more second touch nodes of the first column of touch nodes. The first drive signal and the second drive signal can be applied at least partially concurrently. Additionally or alternatively to the examples disclosed above, in some examples, for a second column of touch nodes of the two-axis array of touch nodes, the plurality of drive signals can include a third drive signal applied to one or more first touch nodes of the second column of touch nodes and a fourth drive signal applied to one or more second touch nodes of the second column of touch nodes. The first drive signal, the second drive signal, the third drive signal, and the fourth drive signal can be applied at least partially concurrently. Additionally or alternatively to one or more of the examples disclosed above, in some examples, the first drive signal and the third drive signal can be complimentary drive signals from a first transmitter and the second drive signal and the fourth drive signal can be complimentary drive signals from a second transmitter (e.g., such that the complimentary drive signals are diagonal from one another between two columns). Additionally or alternatively to one or more of the examples disclosed above, in some examples, the first drive signal and the second drive signal can be complimentary drive signals (e.g., such that the complimentary drive signals are adjacent within a column). Additionally or alternatively to the examples disclosed above, in some examples, touch sensor panel can comprise a plurality of routing traces including a first routing trace and a second routing trace. A first row of touch nodes in the two-axis array of touch nodes can include a first group of row touch nodes coupled to touch sensing circuitry via the first routing trace and a second group of row touch nodes coupled to the touch sensing circuitry via the second routing trace. Additionally or alternatively to the examples disclosed above, in some examples, the plurality of routing traces can include a third routing trace and a fourth routing trace. A first column of touch nodes in the two-axis array of touch nodes can include a first group of column touch nodes coupled to the touch sensing circuitry via the third routing trace and a second group of column touch nodes coupled to the touch sensing circuitry via the fourth routing trace. Additionally or alternatively to the examples disclosed above, in some examples, a 4×4 portion of the two-axis array of touch nodes can comprise eight transmitter electrodes of the plurality of transmitter electrodes and eight receiver electrodes of the plurality of receiver electrodes. Additionally or alternatively to the examples disclosed above, in some examples, the drive circuitry can comprise four transmitters coupled to four of the eight transmitter electrodes of the plurality of transmitter electrodes, and four inverters coupled between the four transmitters and another four of the eight transmitter electrodes of the plurality of transmitter electrodes. Additionally or alternatively to the examples disclosed above, in some examples, the sense circuitry can comprise four differential amplifiers. Inverting inputs of the four differential amplifiers can be coupled to four of the eight receiver electrodes of the plurality of receiver electrodes, and non-inverting inputs of the four differential amplifiers can be coupled to another four of the eight receiver electrodes of the plurality of receiver electrodes. Additionally or alternatively to the examples disclosed above, in some examples, a 4×4 portion of the two-axis array of touch nodes can comprise eight transmitter electrodes of the plurality of transmitter electrodes and four receiver electrodes of the plurality of receiver electrodes. Additionally or alternatively to the examples disclosed above, in some examples, the drive circuitry can comprise eight transmitters coupled to the eight transmitter electrodes of the plurality of transmitter electrodes and the sense circuitry can comprise two differential amplifiers. Inverting inputs of the two differential amplifiers can be coupled to two of the four receiver electrodes of the plurality of receiver electrodes, and non-inverting inputs of the two differential amplifiers can be coupled to another two of the four receiver electrodes of the plurality of receiver electrodes. Additionally or alternatively to the examples disclosed above, in some examples, the plurality of transmitter electrodes and the plurality of receiver electrodes can be formed in a common layer.

Some examples of the disclosure are directed to a portable consumer electronic device. The portable consumer electronic device can comprise: an energy storage device (e.g., a battery); communication circuitry (e.g., wireless); and a touch screen. The touch screen can include: a display; a plurality of touch electrodes (e.g., disposed over the display) including a plurality of touch electrodes including a plurality of first touch electrodes and a plurality of second touch electrodes, the plurality of touch electrodes forming a two-axis array of touch nodes. Capacitive coupling of the plurality of first touch electrodes configured as transmitter electrodes and the plurality of second touch electrodes configured as receiver electrodes can be substantially spatially alternating (e.g., alternating along one or two dimensions). Additionally or alternatively to the examples disclosed above, in some examples, the touch screen further includes: drive circuitry coupled to the plurality of first touch electrodes and configured to drive the plurality of first touch electrodes with a plurality of drive signals, and sense circuitry coupled to the plurality of second touch electrodes and configured to differentially sense the plurality of touch electrodes. For a first set of touch nodes, the plurality of drive signals can include a first drive signal applied to one or more first touch nodes of the first set of touch nodes and a second drive signal applied to a one or more second touch nodes of the first set of touch nodes. The first drive signal and the second drive signal can be applied at least partially concurrently. Additionally or alternatively to the examples disclosed above, in some examples, for a second set of touch nodes, the plurality of drive signals can include a third drive signal applied to one or more first touch nodes of the second set of touch nodes and a fourth drive signal applied to a one or more second touch nodes of the second set of touch nodes. The first drive signal, the second drive signal, the third drive signal, and the fourth drive signal can be applied at least partially concurrently. Additionally or alternatively to the examples disclosed above, in some examples, a 4×4 portion of the two-axis array of touch nodes can comprise eight touch electrodes of the plurality of first touch electrodes and eight touch electrodes of the plurality of second touch electrodes. Additionally or alternatively to the examples disclosed above, in some examples, the drive circuitry can comprise: four transmitters coupled to four of the eight touch electrodes of the plurality of first touch electrodes; and four inverters coupled between the four transmitters and another four of the eight touch electrodes of the plurality of first touch electrodes. Additionally or alternatively to the examples disclosed above, in some examples, the sense circuitry can comprise: four differential amplifiers. Inverting inputs of the four differential amplifiers can be coupled to four of the eight touch electrodes of the plurality of second touch electrodes, and non-inverting inputs of the four differential amplifiers can be coupled to another four of the eight touch electrodes of the plurality of second touch electrodes. Additionally or alternatively to the examples disclosed above, in some examples, a 4×4 portion of the two-dimensional array of touch nodes can comprise eight touch electrodes of the plurality of first touch electrodes and four touch electrodes of the plurality of second touch electrodes. Additionally or alternatively to the examples disclosed above, in some examples, the drive circuitry can comprise eight transmitters coupled to the eight touch electrodes of the plurality of first touch electrodes and the sense circuitry can comprise two differential amplifiers. Inverting inputs of the two differential amplifiers can be coupled to two of the four touch electrodes of the plurality of second touch electrodes, and non-inverting inputs of the two differential amplifiers can be coupled to another two of the four touch electrodes of the plurality of second touch electrodes. Additionally or alternatively to the examples disclosed above, in some examples, the plurality of first touch electrodes and the plurality of second touch electrodes can be formed in a common layer.

Some examples are directed to mutual capacitance touch sensor panel. The mutual capacitance touch sensor panel can comprise a plurality of touch electrodes including a plurality of transmitter electrodes and a plurality of receiver electrodes interleaved with the plurality of transmitter electrodes. The plurality of touch electrodes can be interconnected into groups forming a two-axis array of touch nodes. The plurality of transmitter electrodes can be configured for being driven with a plurality of stimulation signals such that electrostatic fringe field coupling of the plurality of transmitter electrodes and the plurality of receiver electrodes can include a spatially patterned arrangement of electrostatic fringe field couplings above a threshold and electrostatic fringe field couplings below the threshold along at least a first axis of the two-axis array of touch nodes. The electrostatic fringe field couplings above the threshold can be separated along the first axis by one or more of the electrostatic fringe field couplings below the threshold in the spatially patterned arrangement. Additionally or alternatively to one or more of the examples disclosed above, in some examples, the plurality of transmitter electrodes can be configured for being driven with the plurality of stimulation signals such that electrostatic fringe field coupling of the plurality of transmitter electrodes and the plurality of receiver electrodes can include the spatially patterned arrangement of the electrostatic fringe field couplings above the threshold and the electrostatic fringe field couplings below the threshold along a second axis of the two-axis array of touch nodes. The electrostatic fringe field couplings above the threshold can be separated along the second axis by one or more of the electrostatic fringe field couplings below the threshold in the spatially patterned arrangement. Additionally or alternatively to one or more of the examples disclosed above, in some examples, the spatially patterned arrangement can alternate between an electrostatic fringe field coupling above the threshold and an electrostatic fringe field coupling below the threshold along the first axis and/or second axis. Additionally or alternatively to one or more of the examples disclosed above, in some examples, the electrostatic fringe field couplings above the threshold can be separated by two or more of the electrostatic fringe field couplings below the threshold in the spatially patterned arrangement (along the first axis and/or second axis). Additionally or alternatively to the examples disclosed above, in some examples, the touch sensor panel can further comprise: drive circuitry coupled to the plurality of transmitter electrodes and configured to drive the plurality of transmitter electrodes with a plurality of drive signals, and sense circuitry coupled to the plurality of receiver electrodes and configured to differentially sense the plurality of receiver electrodes. Additionally or alternatively to the examples disclosed above, in some examples, for a first column of touch nodes in the two-axis array of touch nodes, the plurality of drive signals can include a first drive signal applied to one or more first touch nodes of the first column of touch nodes and a second drive signal applied to one or more second touch nodes of the first column of touch nodes. The first drive signal and the second drive signal can be applied at least partially concurrently. Additionally or alternatively to the examples disclosed above, in some examples, for a second column of touch nodes of the two-axis array of touch nodes, the plurality of drive signals can include a third drive signal applied to one or more first touch nodes of the second column of touch nodes and a fourth drive signal applied to one or more second touch nodes of the second column of touch nodes. The first drive signal, the second drive signal, the third drive signal, and the fourth drive signal can be applied at least partially concurrently. Additionally or alternatively to the examples disclosed above, in some examples, touch sensor panel can comprise a plurality of routing traces including a first routing trace and a second routing trace. A first row of touch nodes in the two-axis array of touch nodes can include a first group of row touch nodes coupled to touch sensing circuitry via the first routing trace and a second group of row touch nodes coupled to the touch sensing circuitry via the second routing trace. Additionally or alternatively to the examples disclosed above, in some examples, the plurality of routing traces can include a third routing trace and a fourth routing trace. A first column of touch nodes in the two-axis array of touch nodes can include a first group of column touch nodes coupled to the touch sensing circuitry via the third routing trace and a second group of column touch nodes coupled to the touch sensing circuitry via the fourth routing trace. Additionally or alternatively to the examples disclosed above, in some examples, a 4×4 portion of the two-axis array of touch nodes can comprise eight transmitter electrodes of the plurality of transmitter electrodes and eight receiver electrodes of the plurality of receiver electrodes. Additionally or alternatively to the examples disclosed above, in some examples, the drive circuitry can comprise four transmitters coupled to four of the eight transmitter electrodes of the plurality of transmitter electrodes, and four inverters coupled between the four transmitters and another four of the eight transmitter electrodes of the plurality of transmitter electrodes. Additionally or alternatively to the examples disclosed above, in some examples, the sense circuitry can comprise four differential amplifiers. Inverting inputs of the four differential amplifiers can be coupled to four of the eight receiver electrodes of the plurality of receiver electrodes, and non-inverting inputs of the four differential amplifiers can be coupled to another four of the eight receiver electrodes of the plurality of receiver electrodes. Additionally or alternatively to the examples disclosed above, in some examples, a 4×4 portion of the two-axis array of touch nodes can comprise eight transmitter electrodes of the plurality of transmitter electrodes and four receiver electrodes of the plurality of receiver electrodes. Additionally or alternatively to the examples disclosed above, in some examples, the drive circuitry can comprise eight transmitters coupled to the eight transmitter electrodes of the plurality of transmitter electrodes and the sense circuitry can comprise two differential amplifiers. Inverting inputs of the two differential amplifiers can be coupled to two of the four receiver electrodes of the plurality of receiver electrodes, and non-inverting inputs of the two differential amplifiers can be coupled to another two of the four receiver electrodes of the plurality of receiver electrodes. Additionally or alternatively to the examples disclosed above, in some examples, the plurality of transmitter electrodes and the plurality of receiver electrodes can be formed in a common layer.

Some examples of the disclosure are directed to a portable consumer electronic device. The portable consumer electronic device can comprise: an energy storage device (e.g., a battery); communication circuitry (e.g., wireless); and a touch screen. The touch screen can include: a display; a plurality of touch electrodes (e.g., disposed over the display) including a plurality of touch electrodes including a plurality of first touch electrodes and a plurality of second touch electrodes, the plurality of touch electrodes forming a two-axis array of touch nodes. Capacitive coupling of the plurality of first touch electrodes configured as transmitter electrodes and the plurality of second touch electrodes configured as receiver electrodes can be spatially patterned such that capacitive couplings above a threshold are separated along a first axis of the two-axis array of touch nodes by one or more capacitive couplings below the threshold. Additionally or alternatively to one or more of the examples disclosed above, in some examples, the capacitive coupling of the plurality of first touch electrodes configured as transmitter electrodes and the plurality of second touch electrodes configured as receiver electrodes can be spatially patterned such that capacitive couplings above the threshold are separated along a second axis of the two-axis array of touch nodes by one or more capacitive couplings below the threshold. Additionally or alternatively to one or more of the examples disclosed above, in some examples, the capacitive couplings can alternate between a capacitive coupling above the threshold and a capacitive coupling below the threshold along the first axis and/or second axis. Additionally or alternatively to one or more of the examples disclosed above, in some examples, the capacitive couplings above the threshold can be separated by two or more of the capacitive couplings below the threshold (along the first axis and/or second axis). Additionally or alternatively to the examples disclosed above, in some examples, the touch screen further includes: drive circuitry coupled to the plurality of first touch electrodes and configured to drive the plurality of first touch electrodes with a plurality of drive signals, and sense circuitry coupled to the plurality of second touch electrodes and configured to differentially sense the plurality of touch electrodes. For a first set of touch nodes, the plurality of drive signals can include a first drive signal applied to one or more first touch nodes of the first set of touch nodes and a second drive signal applied to a one or more second touch nodes of the first set of touch nodes. The first drive signal and the second drive signal can be applied at least partially concurrently. Additionally or alternatively to the examples disclosed above, in some examples, for a second set of touch nodes, the plurality of drive signals can include a third drive signal applied to one or more first touch nodes of the second set of touch nodes and a fourth drive signal applied to a one or more second touch nodes of the second set of touch nodes. The first drive signal, the second drive signal, the third drive signal, and the fourth drive signal can be applied at least partially concurrently. Additionally or alternatively to the examples disclosed above, in some examples, a 4×4 portion of the two-axis array of touch nodes can comprise eight touch electrodes of the plurality of first touch electrodes and eight touch electrodes of the plurality of second touch electrodes. Additionally or alternatively to the examples disclosed above, in some examples, the drive circuitry can comprise: four transmitters coupled to four of the eight touch electrodes of the plurality of first touch electrodes; and four inverters coupled between the four transmitters and another four of the eight touch electrodes of the plurality of first touch electrodes. Additionally or alternatively to the examples disclosed above, in some examples, the sense circuitry can comprise: four differential amplifiers. Inverting inputs of the four differential amplifiers can be coupled to four of the eight touch electrodes of the plurality of second touch electrodes, and non-inverting inputs of the four differential amplifiers can be coupled to another four of the eight touch electrodes of the plurality of second touch electrodes. Additionally or alternatively to the examples disclosed above, in some examples, a 4×4 portion of the two-dimensional array of touch nodes can comprise eight touch electrodes of the plurality of first touch electrodes and four touch electrodes of the plurality of second touch electrodes. Additionally or alternatively to the examples disclosed above, in some examples, the drive circuitry can comprise eight transmitters coupled to the eight touch electrodes of the plurality of first touch electrodes and the sense circuitry can comprise two differential amplifiers. Inverting inputs of the two differential amplifiers can be coupled to two of the four touch electrodes of the plurality of second touch electrodes, and non-inverting inputs of the two differential amplifiers can be coupled to another two of the four touch electrodes of the plurality of second touch electrodes. Additionally or alternatively to the examples disclosed above, in some examples, the plurality of first touch electrodes and the plurality of second touch electrodes can be formed in a common layer.

Some examples of the disclosure are directed to a mutual capacitance touch sensor panel (or a portable consumer electronic device including the mutual capacitance touch sensor panel, an energy storage device and communication circuitry). The mutual capacitance touch sensor panel can comprise a plurality of touch electrodes including a plurality of transmitter electrodes and a plurality of receiver electrodes interleaved with the plurality of transmitter electrodes. The plurality of touch electrodes interconnected into groups forming a two-axis array of touch nodes. The mutual capacitance touch sensor panel can further comprise a plurality of routing traces including a plurality of transmitter routing traces and a plurality of receiver routing traces. The plurality of transmitter routing traces can interconnect the plurality of transmitter electrodes and the plurality of receiver routing traces can interconnect the plurality of receiver electrodes. The plurality of transmitter routing traces or the plurality of receiver routing traces can be oriented differently than the two-axis array. Additionally or alternatively to one or more of the examples disclosed above, in some examples, the two-axis array of touch nodes can be a row-column array, and the plurality of transmitter routing traces or the plurality of receiver routing traces can be oriented along a diagonal (or multiple diagonals) different than axes of the row-column array. Additionally or alternatively to one or more of the examples disclosed above, in some examples, the plurality of transmitter routing traces and the plurality of receiver routing traces can be oriented differently than (e.g., diagonal to) the two-axis array. Additionally or alternatively to one or more of the examples disclosed above, in some examples, the plurality of transmitter routing traces can be oriented in a non-rectilinear arrangement and the plurality of receiver routing traces can be oriented in a rectilinear arrangement.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A mutual capacitance touch sensor panel comprising:
a plurality of touch electrodes including a plurality of transmitter electrodes and a plurality of receiver electrodes interleaved with the plurality of transmitter electrodes, the plurality of touch electrodes interconnected into groups forming a two-axis array of touch nodes;
wherein the plurality of receiver electrodes is configured for being sensed differentially and wherein the plurality of transmitter electrodes is configured for being driven with a plurality of stimulation signals such that electrostatic fringe field coupling of the plurality of transmitter electrodes and the plurality of receiver electrodes includes a spatially patterned arrangement of electrostatic fringe field couplings above a threshold and electrostatic fringe field couplings below the threshold along a first axis of the two-axis array of touch nodes, wherein the electrostatic fringe field couplings above the threshold are separated along the first axis by one or more of the electrostatic fringe field couplings below the threshold in the spatially patterned arrangement.

2. The mutual capacitance touch sensor panel of claim 1, further comprising:
drive circuitry coupled to the plurality of transmitter electrodes and configured to drive the plurality of transmitter electrodes with a plurality of drive signals, wherein for a first column of touch nodes in the two-axis array of touch nodes, the plurality of drive signals includes a first drive signal applied to one or more first touch nodes of the first column of touch nodes and a second drive signal applied to one or more second touch nodes of the first column of touch nodes, wherein the first drive signal and the second drive signal are applied at least partially concurrently; and
sense circuitry coupled to the plurality of receiver electrodes and configured to differentially sense the plurality of receiver electrodes.

3. The mutual capacitance touch sensor panel of claim 2, wherein for a second column of touch nodes of the two-axis array of touch nodes, the plurality of drive signals includes a third drive signal applied to one or more first touch nodes of the second column of touch nodes and a fourth drive signal applied to one or more second touch nodes of the second column of touch nodes, wherein the first drive signal, the second drive signal, the third drive signal, and the fourth drive signal are applied at least partially concurrently.

4. The mutual capacitance touch sensor panel of claim 3, wherein the first drive signal and the third drive signal are complimentary drive signals from a first transmitter and the second drive signal and the fourth drive signal are complimentary drive signals from a second transmitter.

5. The mutual capacitance touch sensor panel of claim 2, wherein the first drive signal and the second drive signal are complimentary drive signals.

6. The mutual capacitance touch sensor panel of claim 1, further comprising:
a plurality of routing traces including a first routing trace and a second routing trace;
wherein a first row of touch nodes in the two-axis array of touch nodes includes a first group of row touch nodes coupled to touch sensing circuitry via the first routing trace and a second group of row touch nodes coupled to the touch sensing circuitry via the second routing trace.

7. The mutual capacitance touch sensor panel of claim 6, wherein the plurality of routing traces includes a third routing trace and a fourth routing trace;
wherein a first column of touch nodes in the two-axis array of touch nodes includes a first group of column touch nodes coupled to the touch sensing circuitry via the third routing trace and a second group of column touch nodes coupled to the touch sensing circuitry via the fourth routing trace.

8. The mutual capacitance touch sensor panel of claim 1, wherein a 4×4 portion of the two-axis array of touch nodes comprises eight transmitter electrodes of the plurality of transmitter electrodes and eight receiver electrodes of the plurality of receiver electrodes.

9. The mutual capacitance touch sensor panel of claim 8, further comprising drive circuitry, wherein the drive circuitry comprises:
four transmitters coupled to four of the eight transmitter electrodes of the plurality of transmitter electrodes; and
four inverters coupled between the four transmitters and another four of the eight transmitter electrodes of the plurality of transmitter electrodes.

10. The mutual capacitance touch sensor panel of claim 8, further comprising sense circuitry, wherein the sense circuitry comprises:
four differential amplifiers;
wherein inverting inputs of the four differential amplifiers are coupled to four of the eight receiver electrodes of the plurality of receiver electrodes, and non-inverting inputs of the four differential amplifiers are coupled to another four of the eight receiver electrodes of the plurality of receiver electrodes.

11. The mutual capacitance touch sensor panel of claim 1, wherein a 4×4 portion of the two-axis array of touch nodes comprises eight transmitter electrodes of the plurality of transmitter electrodes and four receiver electrodes of the plurality of receiver electrodes.

12. The mutual capacitance touch sensor panel of claim 11, further comprising: drive circuitry and sense circuitry, wherein the drive circuitry comprises eight transmitters coupled to the eight transmitter electrodes of the plurality of transmitter electrodes and the sense circuitry comprises two differential amplifiers, wherein inverting inputs of the two differential amplifiers are coupled to two of the four receiver electrodes of the plurality of receiver electrodes, and non-inverting inputs of the two differential amplifiers are coupled to another two of the four receiver electrodes of the plurality of receiver electrodes.

13. The mutual capacitance touch sensor panel of claim 1, wherein the plurality of transmitter electrodes and the plurality of receiver electrodes are formed in a common layer.

14. A portable consumer electronic device comprising:
an energy storage device;
communication circuitry; and
a touch screen including:
- a display; and
- a plurality of touch electrodes including a plurality of first touch electrodes and a plurality of second touch electrodes, the plurality of touch electrodes forming a two-axis array of touch nodes;
- wherein the plurality of second touch electrodes is configured for being sensed differentially and wherein capacitive coupling of the plurality of first touch electrodes configured as transmitter electrodes and the plurality of second touch electrodes configured as receiver electrodes is spatially patterned such that capacitive couplings above a threshold are separated along a first axis of the two-axis array of touch nodes by one or more capacitive couplings below the threshold.

15. The portable consumer electronic device of claim 14, the touch screen further including:
- drive circuitry coupled to the plurality of first touch electrodes and configured to drive the plurality of first touch electrodes with a plurality of drive signals, wherein for a first set of touch nodes, the plurality of drive signals includes a first drive signal applied to one or more first touch nodes of the first set of touch nodes and a second drive signal applied to one or more second touch nodes of the first set of touch nodes, wherein the first drive signal and the second drive signal are applied at least partially concurrently; and
- sense circuitry coupled to the plurality of second touch electrodes and configured to differentially sense the plurality of second touch electrodes.

16. The portable consumer electronic device of claim 15, wherein for a second set of touch nodes, the plurality of drive signals includes a third drive signal applied to one or more first touch nodes of the second set of touch nodes and a fourth drive signal applied to one or more second touch nodes of the second set of touch nodes, wherein the first drive signal, the second drive signal, the third drive signal, and the fourth drive signal are applied at least partially concurrently.

17. The portable consumer electronic device of claim 14, wherein a 4×4 portion of the two-axis array of touch nodes comprises eight touch electrodes of the plurality of first touch electrodes and eight touch electrodes of the plurality of second touch electrodes.

18. The portable consumer electronic device of claim 17, further comprising drive circuitry, wherein the drive circuitry comprises:
- four transmitters coupled to four of the eight touch electrodes of the plurality of first touch electrodes; and
- four inverters coupled between the four transmitters and another four of the eight touch electrodes of the plurality of first touch electrodes.

19. The portable consumer electronic device of claim 17, further comprising sense circuitry, wherein the sense circuitry comprises:
- four differential amplifiers;
- wherein inverting inputs of the four differential amplifiers are coupled to four of the eight touch electrodes of the plurality of second touch electrodes, and non-inverting inputs of the four differential amplifiers are coupled to another four of the eight touch electrodes of the plurality of second touch electrodes.

20. The portable consumer electronic device of claim 14, wherein a 4×4 portion of the two-axis array of touch nodes comprises eight touch electrodes of the plurality of first touch electrodes and four touch electrodes of the plurality of second touch electrodes.

21. The portable consumer electronic device of claim 20, further comprising drive circuitry and sense circuitry, wherein the drive circuitry comprises eight transmitters coupled to the eight touch electrodes of the plurality of first touch electrodes and the sense circuitry comprises two differential amplifiers, wherein inverting inputs of the two differential amplifiers are coupled to two of the four touch electrodes of the plurality of second touch electrodes, and non-inverting inputs of the two differential amplifiers are coupled to another two of the four touch electrodes of the plurality of second touch electrodes.

22. The portable consumer electronic device of claim 14, wherein the plurality of first touch electrodes and the plurality of second touch electrodes are formed in a common layer.

23. A mutual capacitance touch sensor panel comprising:
- a plurality of touch electrodes including a plurality of transmitter electrodes and a plurality of receiver electrodes interleaved with the plurality of transmitter electrodes, the plurality of touch electrodes interconnected into groups forming a two-axis array of touch nodes; and
- a plurality of routing traces including a plurality of transmitter routing traces and a plurality of receiver routing traces, wherein the plurality of transmitter routing traces interconnect the plurality of transmitter electrodes and the plurality of receiver routing traces interconnect the plurality of receiver electrodes, wherein the plurality of transmitter routing traces or the plurality of receiver routing traces are oriented differently than the two-axis array;
- wherein a first group of the plurality of transmitter electrodes are interconnected by a first plurality of transmitter routing traces of the plurality of transmitter routing traces, and each of the first plurality of transmitter routing traces is parallel to an immediately subsequent transmitter routing trace of the first plurality of transmitter routing traces.

24. The mutual capacitance touch sensor panel of claim 23, wherein the two-axis array of touch nodes is a row-column array, and wherein the plurality of transmitter routing traces or the plurality of receiver routing traces are oriented along a diagonal different than axes of the row-column array.

25. The mutual capacitance touch sensor panel of claim 23, wherein the plurality of transmitter routing traces and the plurality of receiver routing traces are oriented differently than the two-axis array.

26. The mutual capacitance touch sensor panel of claim 23, wherein the plurality of transmitter routing traces is oriented in a non-rectilinear arrangement and the plurality of receiver routing traces is oriented in a rectilinear arrangement.

* * * * *